(12) United States Patent
Kuriyama et al.

(10) Patent No.: US 10,921,442 B2
(45) Date of Patent: Feb. 16, 2021

(54) SENSOR WITH FLAT-BEAM GENERATION ANTENNA

(71) Applicant: HITACHI AUTOMOTIVE SYSTEMS, LTD., Ibaraki (JP)

(72) Inventors: Akira Kuriyama, Tokyo (JP); Hideyuki Nagaishi, Tokyo (JP); Hiroshi Kuroda, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 395 days.

(21) Appl. No.: 15/580,421

(22) PCT Filed: May 13, 2016

(86) PCT No.: PCT/JP2016/064216
§ 371 (c)(1),
(2) Date: Dec. 7, 2017

(87) PCT Pub. No.: WO2016/199538
PCT Pub. Date: Dec. 15, 2016

(65) Prior Publication Data
US 2018/0164430 A1    Jun. 14, 2018

(30) Foreign Application Priority Data

Jun. 8, 2015    (JP) .................................. 2015-116004

(51) Int. Cl.
*G01S 13/931*    (2020.01)
*G01S 7/03*    (2006.01)
(Continued)

(52) U.S. Cl.
CPC .............. *G01S 13/931* (2013.01); *G01S 7/03* (2013.01); *G01S 13/93* (2013.01); *H01P 5/107* (2013.01);
(Continued)

(58) Field of Classification Search
CPC ................................... G01S 7/03; G01S 13/93
See application file for complete search history.

(56) References Cited

U.S. PATENT DOCUMENTS 5,515,059 A * 5/1996 How ........................ H01Q 3/44
342/372
6,133,887 A    10/2000 Tanizaki et al.
(Continued)

FOREIGN PATENT DOCUMENTS

CN    204067583 U    * 12/2014
GB    1087399 A    * 10/1967    ......... G01S 13/4409
(Continued)

OTHER PUBLICATIONS

International Search Report for WO 2016/199538 A1, dated Jul. 19, 2016.

*Primary Examiner* — Marcus E Windrich
(74) *Attorney, Agent, or Firm* — Volpe Koenig

(57) ABSTRACT

A sensor has an antenna. The antenna includes a radiation source and a wave guide. The radiation source is formed on a substrate. The wave guide internally propagates electromagnetic waves radiated from the radiation source and radiates the electromagnetic waves as a beam. The wave guide has a radiation-side opening in which a first direction and a second direction are orthogonal to each other, and the second direction is longer than the first direction. In a cross-sectional shape of the beam, perpendicular to a radiation direction of the beam radiated from the wave guide, a first direction and a second direction are orthogonal to each other, and the second direction is narrower than the first direction.

9 Claims, 22 Drawing Sheets

(51) Int. Cl.
*H01Q 15/08* (2006.01)
*G01S 13/93* (2020.01)
*H01Q 13/02* (2006.01)
*H01Q 9/04* (2006.01)
*H01Q 1/48* (2006.01)
*H01Q 19/06* (2006.01)
*H01P 5/107* (2006.01)
*H01Q 1/38* (2006.01)
*H01Q 13/04* (2006.01)

(52) U.S. Cl.
CPC .............. *H01Q 1/38* (2013.01); *H01Q 1/48* (2013.01); *H01Q 9/0407* (2013.01); *H01Q 13/02* (2013.01); *H01Q 13/0225* (2013.01); *H01Q 13/04* (2013.01); *H01Q 15/08* (2013.01); *H01Q 19/06* (2013.01); *G01S 2013/9317* (2013.01); *G01S 2013/9321* (2013.01); *G01S 2013/9325* (2013.01)

(56) References Cited

U.S. PATENT DOCUMENTS

| | | |
|---|---|---|
| 2002/0101299 A1 | 8/2002 | Kitamori et al. |
| 2007/0285314 A1* | 12/2007 | Mortazawi ........... H01Q 1/3233 342/375 |
| 2009/0251362 A1* | 10/2009 | Margonnenos ....... G01S 13/931 342/175 |
| 2010/0231440 A1* | 9/2010 | Shijo .................. H01Q 21/0075 342/195 |
| 2011/0255634 A1 | 10/2011 | Utagawa et al. |
| 2011/0260906 A1* | 10/2011 | Utagawa .................... G01S 7/03 342/27 |
| 2012/0256784 A1 | 10/2012 | Nakabayashi et al. |
| 2015/0116154 A1* | 4/2015 | Artemenko ........... H01Q 15/08 342/371 |

FOREIGN PATENT DOCUMENTS

| | | |
|---|---|---|
| JP | H09-191213 A | 7/1997 |
| JP | 2000-022423 A | 1/2000 |
| JP | 2000-228608 A | 8/2000 |
| JP | 2000-244210 A | 9/2000 |
| JP | 2004-120792 A | 4/2004 |
| JP | 2010-093547 A | 4/2010 |
| JP | 2012-005928 A | 1/2012 |
| JP | 2012-222507 A | 11/2012 |
| JP | 2013-247495 A | 12/2013 |

* cited by examiner

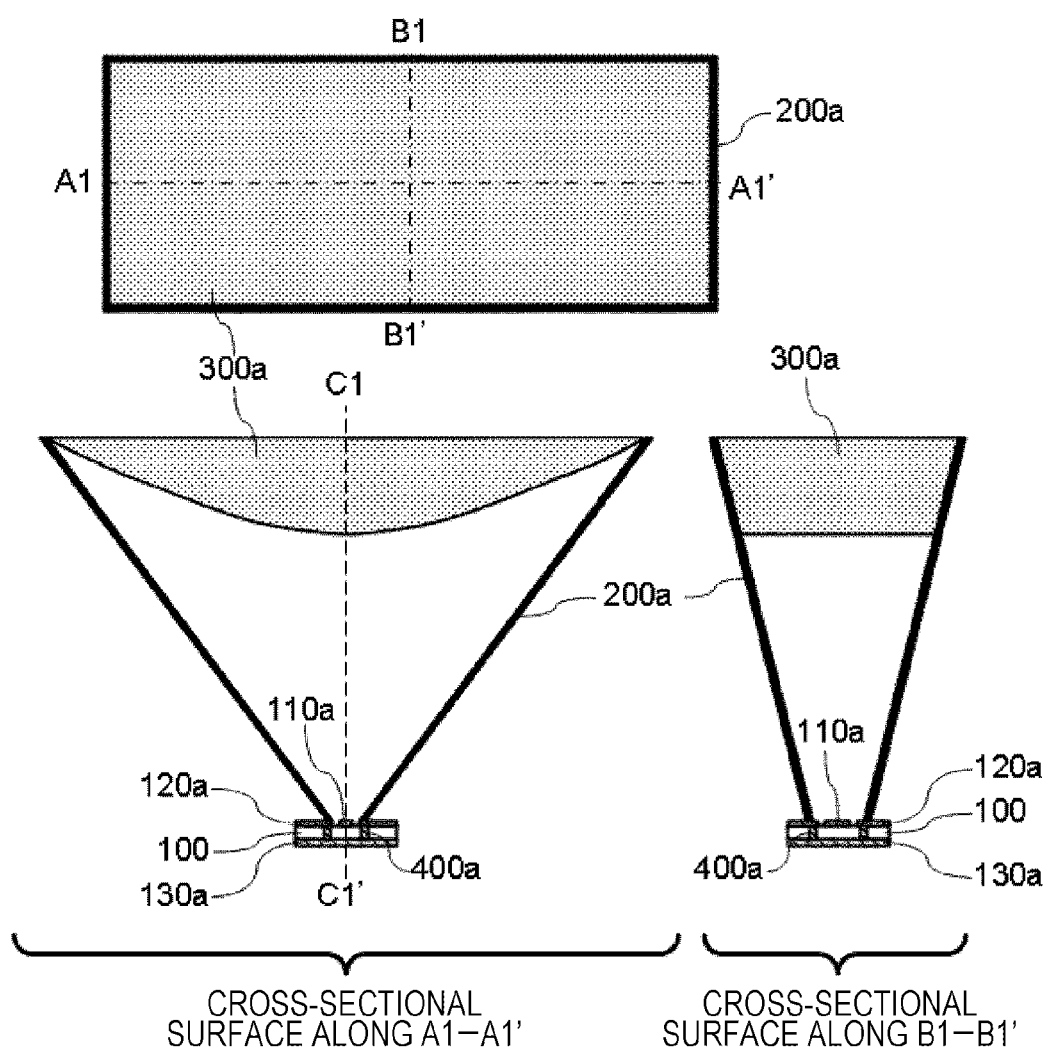

SENSOR WITH FLAT-BEAM GENERATION ANTENNA

TECHNICAL FIELD

The present invention relates to a Doppler sensor or a radar for detecting such as a relative speed, a distance, and an azimuth of a moving body such as an automobile, a railway, and infrastructure equipment and particularly to a sensor and a radar having a flat-beam generation antenna.

BACKGROUND ART

Doppler sensors or radars using radio waves have been put into practical use as surrounding situation detection sensors for safe navigation for such as automobiles, railways, and infrastructure equipment. For simplification, Doppler sensors or radars for automobiles will be described herein.

As Doppler sensors or radars for automobiles, sensors or radars covering all areas such as a forward long distance, a forward middle distance, a forward short distance, sideward and rearward middle distances are required for safe driving support and automatic driving. This is to detect various objects such as forward obstacles, preceding vehicles, rear vehicles, and people in accordance with the driving scene.

There is an antenna structure disclosed in FIG. 1 of PTL 1 or FIG. 1 of PTL 2. PTL 1 describes that a flat beam is generated by differing the number of parallel connections of antenna elements 101 in a direction being connected by a feed line 100 and a direction not connected. PTL 2 describes that a flat beam is generated by differing the number of parallel connections of transmission-side unit antennas 31 to 34 and receiver-side unit antennas 11 and 12 (21 and 22) is set to be different numbers in the horizontal direction and the vertical direction described in FIG. 1 of PTL 2.

However, in the antenna structure disclosed in PTL 1 or PTL 2, the length of a feed line for supplying power to an antenna element or a unit antenna becomes long, and there is a problem that antenna gain decreases due to transmission loss of the feed line.

To reduce the loss due to a feed line, PTL 3 discloses an antenna structure indicated in FIGS. 1 and 2. In PTL 3, the antenna structure includes a dielectric lens 4 and a primary radiator 6 including one patch antenna 16 and a metallic horn 12. The primary radiator 6 is disposed at a focal position of the dielectric lens 4. By using the horn 16 and the dielectric lens 4, antenna gain improves by collecting electromagnetic waves radiated from one patch antenna 16.

CITATION LIST

Patent Literature

PTL 1: JP 2012-05928 A
PTL 2: JP 2012-222507 A
PTL 3: JP 2000-228608 A

SUMMARY OF INVENTION

Technical Problem

A common problem with Doppler sensors or radars for automobiles is that a radio beam transmitted or received from antennas included in the sensors or radars is required to have a wide flat shape in a horizontal direction and a narrow flat shape in a vertical direction. This is because a field of view with respect to a target object is widened in the horizontal direction, noise (load clutter noise) due to unnecessary radiation from the ground is reduced in the vertical direction, and a detection distance can be extended by increasing detection sensitivity (signal-to-noise ratio) of a received signal.

In the structure disclosed in PTL 3 for reducing the loss due to a feed line which is a problem of PTL 1 or 2, the primary radiator 6 and the dielectric lens 4 are disposed such that a focal length is sufficiently longer than the wavelength of electromagnetic waves, and the electromagnetic waves radiated from the primary radiator 6 are distributed in a substantially circular shape on an opening surface of the dielectric lens 4. Therefore, the electromagnetic waves radiated from the dielectric lens 4 are substantially isotropic beams, and there is a problem that a flat beam cannot be generated as an antenna suitable for a sensor.

Solution to Problem

The disclosed sensor has an antenna. The antenna includes a radiation source and a wave guide. The radiation source is formed on a substrate. The wave guide internally propagates electromagnetic waves radiated from the radiation source and radiates the electromagnetic waves as a beam. The wave guide has a radiation-side opening in which a first direction and a second direction are orthogonal to each other, and the second direction is longer than the first direction. In the cross sectional shape of the beam, perpendicular to a radiation direction of the beam radiated from the wave guide, a first direction and a second direction are orthogonal to each other, and the second direction is narrower than the first direction.

Advantageous Effects of Invention

The disclosed sensor has an antenna which can generate a flat beam suitable for the sensor.

BRIEF DESCRIPTION OF DRAWINGS

FIG. 1 illustrates a structural view of a flat-beam generation antenna.

DESCRIPTION OF EMBODIMENTS

Figure 2A:
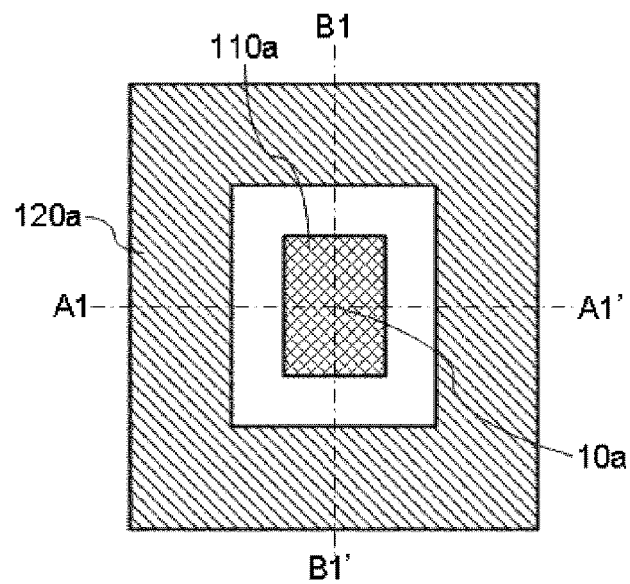
FIG. 2A illustrates a structural view of the flat-beam generation antenna.

Hereinafter, embodiments of the present invention will be described in detail with reference to the drawings. In the drawings for describing the embodiments, members having the same function are denoted by the same reference signs, and redundant descriptions thereof are omitted. The flat-beam generation antenna in each embodiment is included in a main portion of a sensor or a radar (hereinafter, a sensor is represented).

First Embodiment

FIGS. 1 and 2A are structural views of a flat-beam generation antenna according to a first embodiment. In FIGS. 1 and 2A, the flat-beam generation antenna includes a dielectric substrate 100, a first radiation source 110a, a first conductor 120a, a second conductor 130a, a via hole 400a, a first horn 200a, and a first dielectric lens 300a. The first radiation source 110a is formed on a first surface of the dielectric substrate 100. The first conductor 120a is formed on the first surface of the dielectric substrate 100. The second conductor 130a is formed on a second surface opposite to the first surface of the dielectric substrate 100. The via hole 400a is formed on the dielectric substrate 100. At least, an inner side surface of the first horn 200a is formed by a conductor as a wave guide. The first dielectric lens 300a is provided inside the first horn 200a.

A first virtual line A1-A1' is a virtual line in a radiation-side opening surface of the first horn 200a. A second virtual line B1-B1' is a virtual line in the radiation-side opening surface of the first horn 200a. An optical axis C1-C1' is an optical axis of the first dielectric lens 300a. An intersection 10a is an intersection between the optical axis C1-C1' of the dielectric lens 300a and the first surface of the first dielectric substrate 100.

The first virtual line A1-A1' is a line passing through the center of a radiation-side opening of the first horn 200a in the drawing and having the shortest length. The second virtual line B1-B1' is a line passing through the center of the first virtual line A1-A1' and orthogonal to the first virtual line A1-A1'. In the present embodiment, the length of the first virtual line A1-A1' is longer than the length of the second virtual line B1-B1'. That is, in the embodiment, the drawing of the radiation-side opening of the first horn 200a has a rectangular shape in which the length in a direction of the first virtual line A1-A1' is longer than the length in a direction of the second virtual line B1-B1'.

The drawing on the upper side of FIG. 1 indicates a shape of the flat-beam generation antenna according to the embodiment when viewed from the radiation-side opening side of the first horn 200a. Further, the drawing on the lower left side of FIG. 1 indicates a sectional shape along the first virtual line A1-A1' of the flat-beam generation antenna according to the embodiment. Further, the drawing on the lower right side of FIG. 1 indicates a sectional shape along the second virtual line B1-B1' of the flat-beam generation antenna according to the embodiment.

FIG. 2A indicates a shape of the dielectric substrate 100 when viewed from the first surface side. On the first surface of the dielectric substrate 100, the first conductor 120a is formed so as to surround the first radiation source 110a at a predetermined distance from the first radiation source 110a and electrically connected to the second conductor 130a formed on the second surface of the dielectric substrate 100 via the via hole 400a. As a result, the first conductor 120a and the second conductor 130a operate as reference potential surface of the first radiation source 110a, the first radiation source 110a operates as a patch antenna and emits electromagnetic waves in a direction of the first surface of the dielectric substrate 100.

Further, the radiation source-side opening opposite to the radiation-side opening of the first horn 200a is disposed on the first surface side of the dielectric substrate 100 so as to encompass the first radiation source 110a. The structure of the first radiation source 110a and the first horn 200a enable that the electromagnetic waves radiated from the first radiation source 110a are converted from a spherical wave to a plane wave by the first horn 200a, and a beam having directionality in a desired direction is radiated.

Further, in the embodiment, the length of the first virtual line A1-A1' is longer than the second virtual line B1-B1', and therefore a flat beam is formed such that, in the shape of the beam radiated from the first horn 200a, the width in a direction of the second virtual line B1-B1' is wider than the width in a direction of the first virtual line A1-A1'.

An interval at which the via holes 400a are arranged is desirably shorter than the length of a quarter of the wavelength in the dielectric substrate 100 of an electromagnetic wave to be used.

Further, by electrically connecting the first horn 200a to the first conductor 120a, a potential of the first horn 200a can be made equal to a reference potential of the first radiation source 110a. Therefore, the electromagnetic wave radiated from the first radiation source 110a can be efficiently transmitted to the first horn 200a.

Furthermore, by disposing the first dielectric lens 300a having a convex shape in a direction of the radiation source-side opening at the radiation-side opening of the first horn 200a, the length from the radiation source-side opening of the first horn 200a to the radiation-side opening can be shortened, and it is possible to miniaturize an antenna.

Further, the cross-sectional shape of the first dielectric lens 300a has a cylindrical shape in which the direction of the first virtual line A1-A1' is a hyperbolic shape, and the direction of the second virtual line B1-B1' is a linear shape. Accordingly, it is possible to suppress each side-lobe of the beams radiated from the first dielectric lens 300a in the azimuth of the first virtual line A1-A1' and the azimuth of the second virtual line B1-B1'.

In the direction of the first virtual line A1-A1', the center of the first radiation source 110a is desirably disposed at the intersection 10a between the optical axis C1-C1' of the first dielectric lens 300a and the first surface of the dielectric substrate 100.

Second Embodiment

Figure 2B:
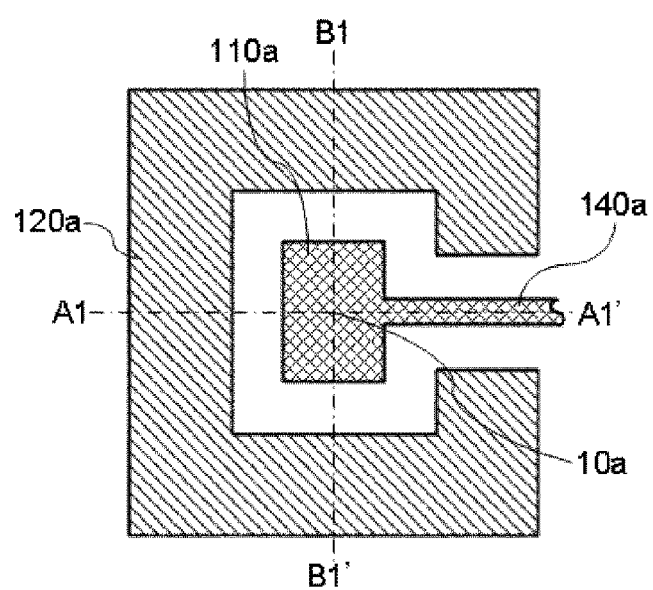
FIG. 2B illustrates a shape of a dielectric substrate included in the flat-beam generation antenna.
Figure 2C:
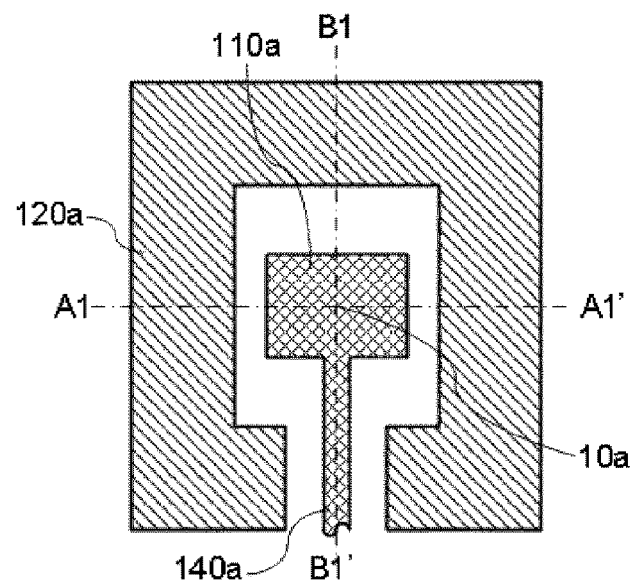
FIG. 2C illustrates a shape of the dielectric substrate included in the flat-beam generation antenna.

FIGS. 2B and 2C indicate shapes of the dielectric substrate 100 included in the flat-beam generation antenna according to the embodiment when viewed from the first surface side. In FIGS. 2B and 2C, a first feed line 140a is a feed line.

In FIGS. 2B and 2C, the first radiation source 110a is connected to the first feed line 140a, and the first conductor 120a is disposed at a predetermined distance from the first radiation source 110a and the first feed line 140a so as to surround the first radiation source 110a.

With such a structure, the first radiation source 110a is supplied with energy of electromagnetic waves radiated from the first radiation source 110a via the first feed line 140a. The structure in which only the first radiation source 110a is connected to the feed line 140a can improve antenna gain.

It should be noted that the connection direction of the first radiation source 110a and the first feed line 140a may be set to either or both of directions in FIGS. 2B and 2C in accordance with a polarization surface of an electromagnetic wave to be used.

Third Embodiment

Figure 3A:
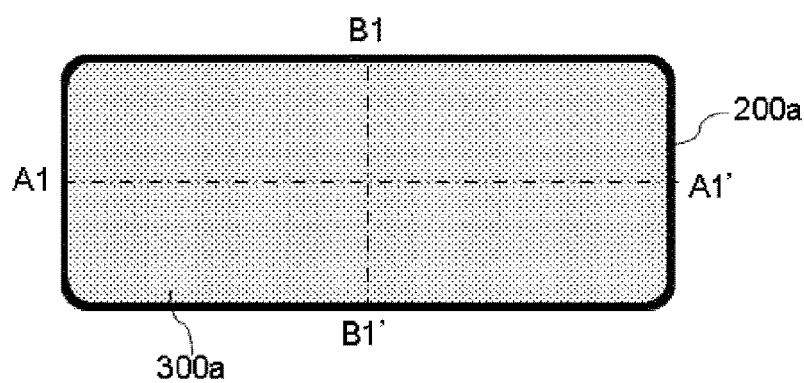
FIG. 3A illustrates a shape of the flat-beam generation antenna when viewed from the opening side of a horn.
Figure 3B:
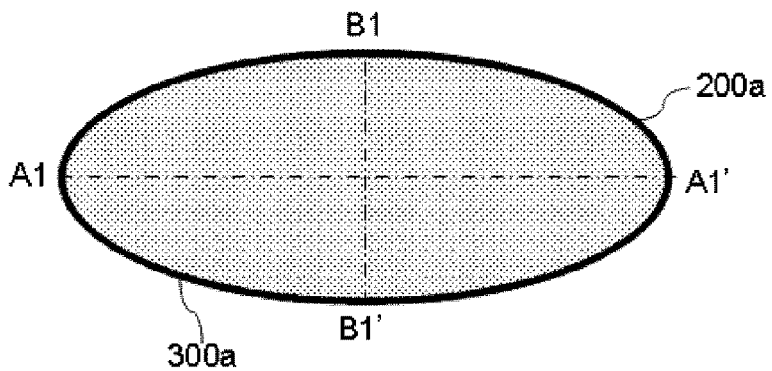
FIG. 3B illustrates a shape of the flat-beam generation antenna when viewed from the opening side of the horn.
Figure 3C:
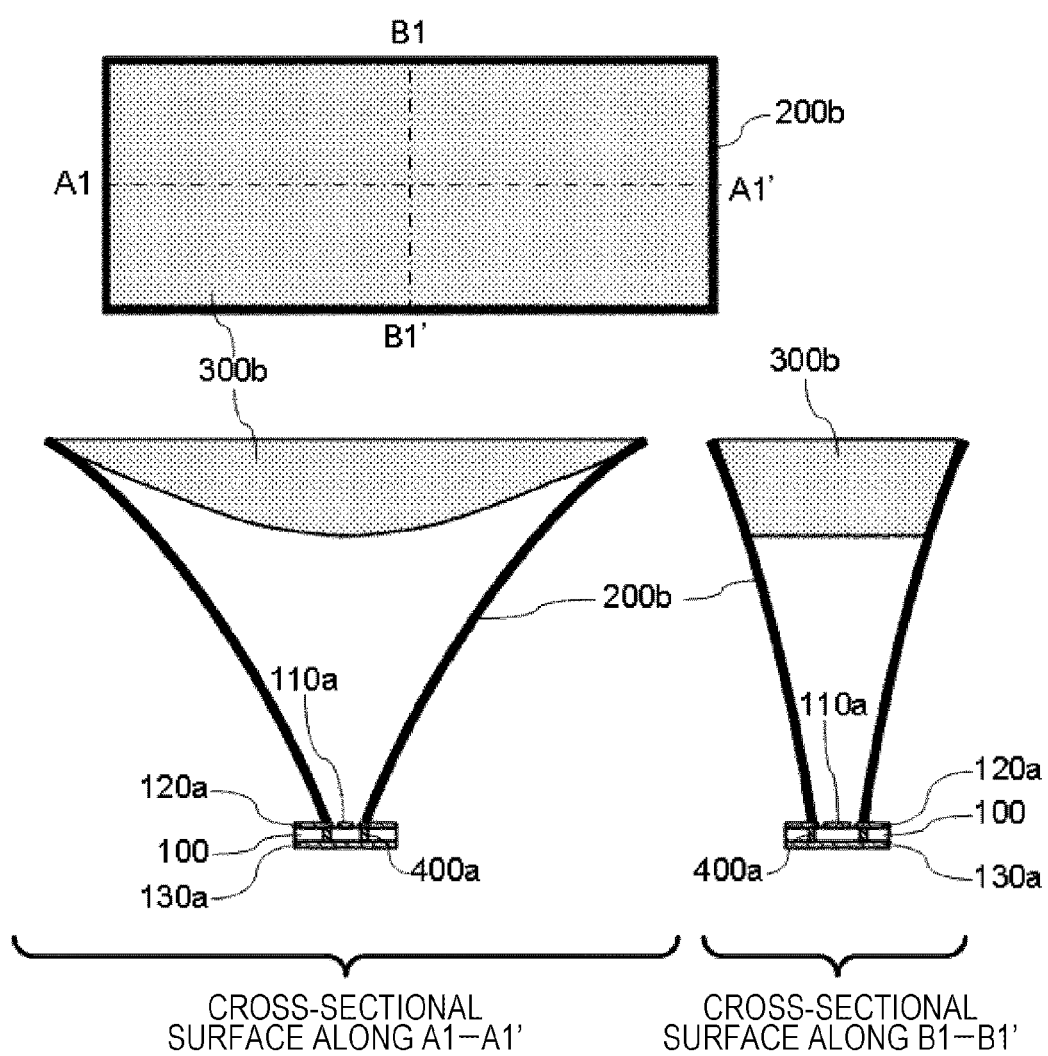
FIG. 3C illustrates a structural view of the flat-beam generation antenna.

FIGS. 3A and 3B indicate a shape of a flat-beam generation antenna according to a third embodiment when viewed from the radiation side opening side of a first horn 200a. FIG. 3C is a structural view of the flat-beam generation antenna according to the present embodiment.

In FIG. 3A, in the shape of the radiation side opening of the first horn 200a, the length in the direction of a first virtual line A1-A1' is longer than the length in the direction of a second virtual line B1-B1', and four corners are curved.

Further, in FIG. 3B, the shape of the radiation side opening of the first horn 200a is an elliptical shape in which the length in the direction of the first virtual line A1-A1' is longer than the length in the direction of the second virtual line B1-B1'.

In the flat-beam generation antenna according to the embodiment, the shape of the radiation-side opening of the first horn 200a is set according to easiness in manufacturing the first horn 200a and a radiation pattern of generated flat beam, and either of the rectangular shape illustrated in FIG. 1 or the curved shape illustrated in FIG. 3A or 3B may be selected. Further, in accordance with a radiation pattern of the generated flat beam, the shape may be a horn shape having a ridge at the radiation-side opening or the radiation source-side opening.

In FIG. 3C, the second horn 200b is different from the first horn 200a, and the second dielectric lens 300b is provided inside the second horn 200b. The flat-beam generation antenna illustrated in FIG. 3C is the same as the first horn 200a except that a side surface of the second horn 200b is curved.

In the flat-beam generation antenna according to the embodiment, the side surface shape of the first horn 200a may be the shape of the second horn 200b.

In addition, the side surface shape of the first horn 200a may be selected in accordance with a radiation pattern of the generated flat beam, such as a shape having irregularities in addition to the linear shape illustrated in FIG. 1 and the curved shape illustrated in FIG. 3C.

Fourth Embodiment

Figure 4:
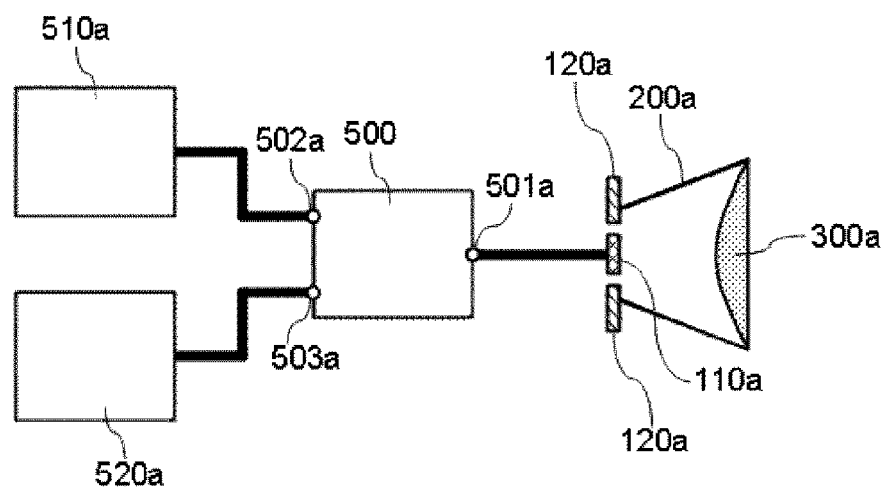
FIG. 4 is a block diagram of a sensor having the flat-beam generation antenna.

FIG. 4 is a block diagram of a sensor having the flat-beam generation antenna according to the first to third embodiments. In FIG. 4, the sensor has a divider circuit 500 having first to third terminals 501a to 503a, a first transmitter circuit 510a, and a first receiver circuit 520a.

In FIG. 4, the flat-beam generation antenna including the first radiation source 110a, the first conductor 120a, the first horn 200a, and the first dielectric lens 300a schematically indicates the antenna configuration described in the first to third embodiments.

In FIG. 4, the first radiation source 110a is connected to the first terminal 501a, the first transmitter circuit 510a is connected to the second terminal 502a, and the first receiver circuit 520a is connected to the third terminal 503a. The divider circuit 500 operates to output a signal input from the second terminal to the first terminal and to output a signal input from the first terminal to the third terminal.

The sensor of the embodiment indicated in FIG. 4 operates as follows. A signal output from the first transmitter circuit 510a is input to the first radiation source 110a via the divider circuit 500 and radiated from the first dielectric lens 300a as an electromagnetic wave. On the other hand, electromagnetic waves radiated from the first dielectric lens 300a is irradiated to such as an obstacle, and the electromagnetic wave reflected by such as the obstacle is converted into an electric signal in the first radiation source 110a via the first dielectric lens 300a and further input to the first receiver circuit 520a via the divider circuit 500.

The sensor having the flat-beam generation antenna operating in this manner is used as a sensor for measuring a distance to such as an obstacle and a relative speed of such as the obstacle.

Fifth Embodiment

Figure 5:
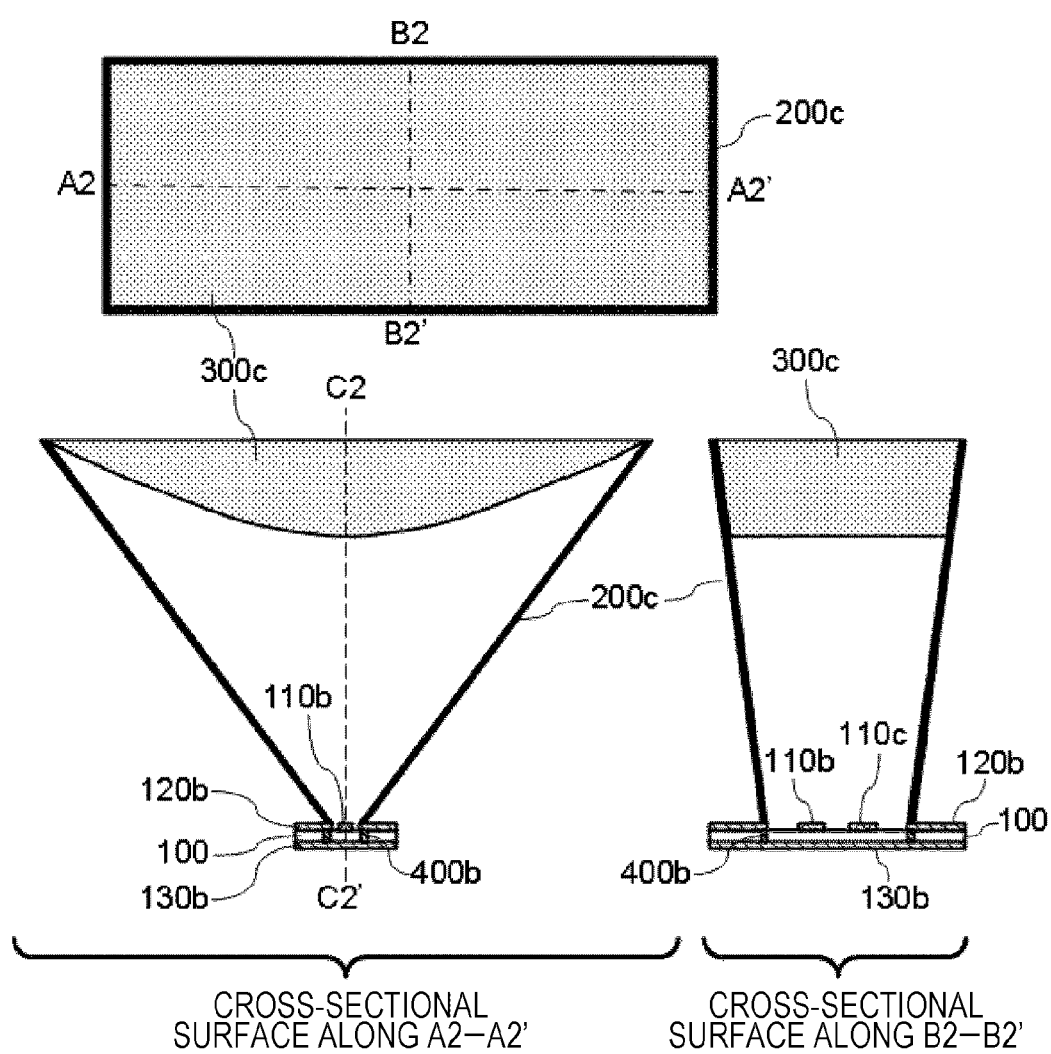
FIG. 5 illustrates a structural view of the flat-beam generation antenna.
Figure 6A:
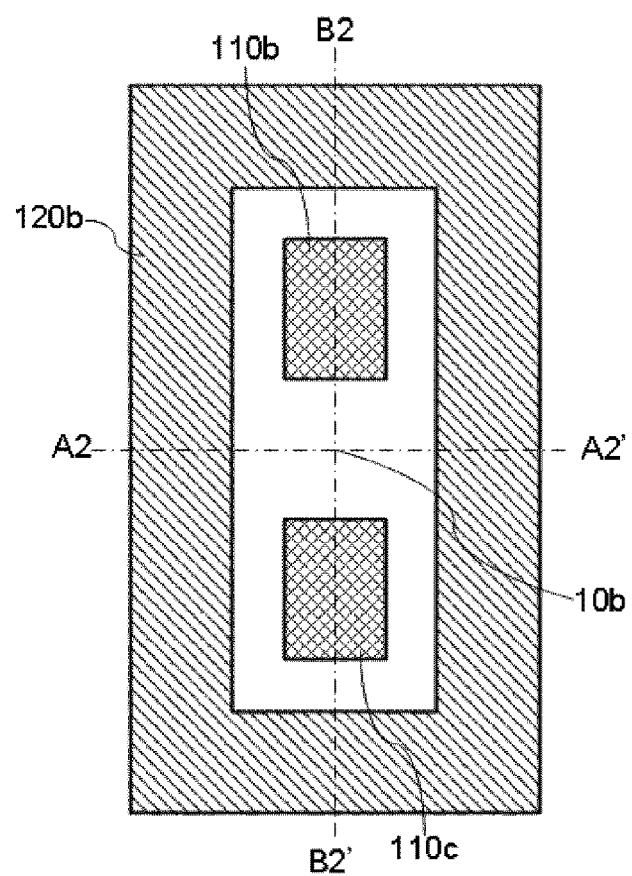
FIG. 6A illustrates a structural view of the flat-beam generation antenna.

FIGS. 5 and 6A are structural diagrams of a flat-beam generation antenna according to a fifth embodiment.

In FIGS. 5 and 6A, the flat-beam generation antenna includes a dielectric substrate 100, second and third radiation sources 110b and 110c, a third conductor 120b, a fourth conductor 130b, a via hole 400b, a third horn 200c, and a third dielectric lens 300c. The second and third radiation sources 110b and 110c are formed on a first surface of the dielectric substrate 100. The third conductor 120b is formed on the first surface of the dielectric substrate 100. The fourth conductor 130b is formed on the second surface opposite to the first surface of the dielectric substrate 100. The via hole 400b is formed to the dielectric substrate 100. The third horn 200c is disposed on the first surface side of the dielectric substrate 100, and at least an inner surface thereof is formed of a conductor. The third dielectric lens 300c is provided inside the third horn 200c.

A third virtual line A2-A2' is a virtual line in a radiation-side opening surface of the third horn 200c. A fourth virtual line B2-B2' is a virtual line in the radiation-side opening surface of the third horn 200c. An optical axis C2-C2' is an optical axis of the third dielectric lens 300c. An intersection 10b is an intersection between the optical axis C2-C2' of the third dielectric lens 300b and the first surface of the dielectric substrate 100.

The third virtual line A2-A2' is a line passing through the center of a radiation-side opening of the third horn 200c in the drawing and having the shortest length. The fourth virtual line B2-B2' is a line passing through the center of the third virtual line A2-A2' and orthogonal to the third virtual line A2-A2'. In the present embodiment, the length of the third virtual line A2-A2' is longer than the length of the fourth virtual line B2-B2'. That is, in the embodiment, the drawing of the radiation-side opening of the third horn 200c has a rectangular shape in which the length in a direction of the third virtual line A2-A2' is longer than the length in a direction of the fourth virtual line B2-B2'.

The drawing on the upper side of FIG. 5 indicates a shape of the flat-beam generation antenna according to the embodiment when viewed from the radiation-side opening side of the third horn 200c. Further, the drawing on the lower left side of FIG. 5 indicates a sectional shape along the third virtual line A2-A2' of the flat-beam generation antenna of the embodiment. Further, the drawing on the lower right side of FIG. 5 indicates a sectional shape along the fourth virtual line B2-B2' of the flat-beam generation antenna according to the embodiment.

FIG. 6A indicates a shape of the dielectric substrate 100 when viewed from the first surface side. On the first surface of the dielectric substrate 100, the third conductor 120b is formed so as to surround the second and third radiation sources 110b and 110c at a predetermined distance from the second and third radiation sources 110b and 110c and electrically connected to the fourth conductor 130b formed on the second surface of the dielectric substrate 100 via the via hole 400b. As a result, the third conductor 120b and the fourth conductor 130b operate as a reference potential surface of the second and third radiation sources 110b and 110c, and therefore each of the second and third radiation sources 110b and 110c operate as a patch antenna and emits electromagnetic waves in a direction of the first surface of the dielectric substrate 100.

Further, the radiation source-side opening opposite to the radiation-side opening of the third horn 200c is disposed on the first surface side of the dielectric substrate 100 so as to encompass the second and third radiation sources 110b and 110c. The structures of the second and third radiation sources 110b and 110c and the third horn 200c enable that electromagnetic waves radiated from the second and third radiation sources 110b and 110c are converted from a spherical wave to a plane wave by the third horn 200c, and a beam having directionality in a desired direction is radiated.

Further, in the embodiment, the length of the third virtual line A2-A2' is longer than the fourth virtual line B2-B2', and therefore a flat beam is formed such that, in the shape of the beam radiated from the third horn 200c, the width in a direction of the fourth virtual line B2-B2' is wider than the width in a direction of the third virtual line A2-A2'.

An interval at which the via holes 400b is arranged desirably shorter than the length of a quarter of wavelength in the dielectric substrate 100 of the electromagnetic wave to be used.

Further, by electrically connecting the third horn 200c to the third conductor 120b, a potential of the third horn 200c can be made equal to the reference potential of the second and third radiation sources 110b and 110c. Therefore, electromagnetic waves radiated from the second and third radiation sources 110b and 110c can be efficiently transmitted to the third horn 200c.

Furthermore, by disposing the third dielectric lens 300c having a convex shape in a direction of the radiation source-side opening at the radiation side opening of the third horn 200c, the length from the radiation source-side opening to the radiation-side opening of the third horn 200c can be shortened, and it is possible to miniaturize an antenna.

Further, the cross-sectional shape of the third dielectric lens 300c has a cylindrical shape in which the direction of the third virtual line A2-A2' is a hyperbolic shape, and the direction of the fourth virtual line B2-B2' is a linear shape. Accordingly, it is possible to suppress each side-lobe of the beams radiated from the third dielectric lens 300c in the azimuth of the third virtual line A2-A2' and the azimuth of the fourth virtual line B2-B2'.

In the direction of the third virtual line A2-A2', the centers of the second and third radiation sources 110b and 110c are desirably disposed at symmetrical positions with respect to an intersection 10b between the optical axis C2-C2' of the third dielectric lens 300c and the first surface of the dielectric substrate 100. Further, the centers of the second and third radiation sources 110b and 110c are preferably disposed in the direction of the fourth virtual line B2-B2'.

It should be noted that the shape of the radiation side opening of the third horn 200c may have any shape described in the third embodiment. Further, the side surface shape of the third horn 200c may have any shape described in the third embodiment.

Sixth Embodiment

Figure 6B:
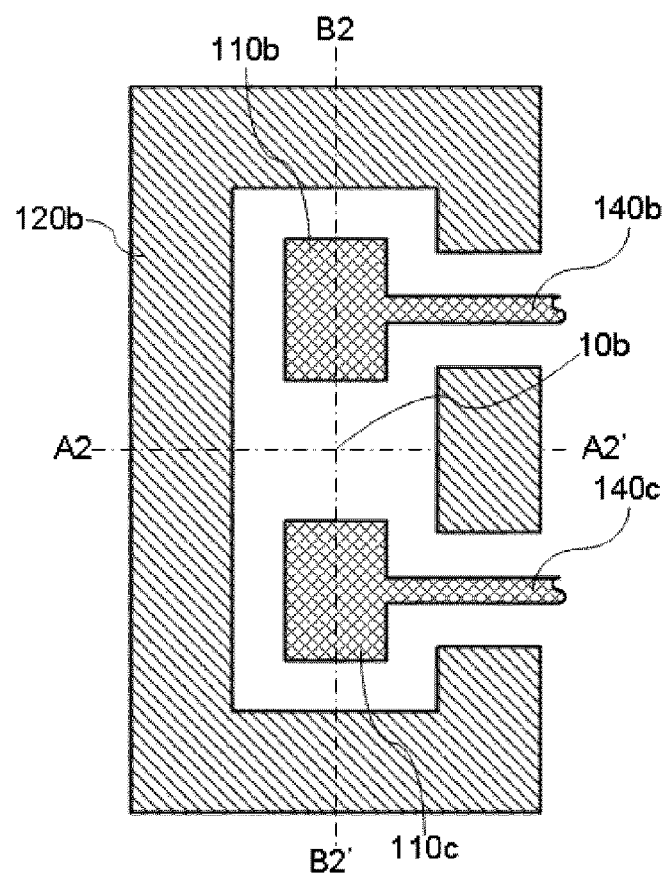
FIG. 6B illustrates a shape of a dielectric substrate included in the flat-beam generation antenna.
Figure 6C:
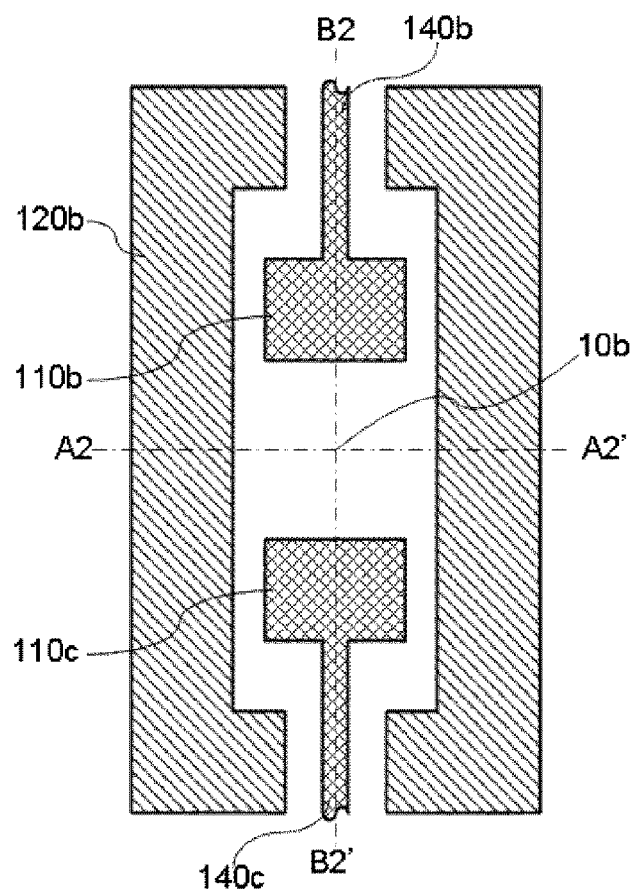
FIG. 6C illustrates a shape of the dielectric substrate included in the flat-beam generation antenna.

FIGS. 6B and 6C indicate shapes of the dielectric substrate 100 included in the flat-beam generation antenna according to the embodiment when viewed from the first surface side. In FIGS. 6B and 6C, each of the second and third feed lines 140b and 140c is a feed line.

In FIGS. 6B and 6C, the second radiation source 110b is connected to the second feed line 140b, the third radiation source 110c is connected to the third feed line 140c, and the third conductor 120b is formed so as to surround the second and third radiation sources 110b and 110c at a predetermined distance from the second and third radiation sources 110b and 110c and the second and third feed lines 140b and 140c.

With such a structure, the second radiation source 110b is supplied with energy of electromagnetic waves radiated from the second radiation source 110b via the second feed line 140b, and the third radiation source 110c is supplied with energy of electromagnetic waves radiated from the third radiation source 110c via the third feed line 140c.

A connection direction of the second radiation source 110b and the second feed line 140b and a connection direction of the third radiation source 110c and the third feed line 140c are set in accordance with a polarization plane of the electromagnetic wave to be used and may be either or both of the directions of FIG. 6B and FIG. 6C.

Seventh Embodiment

Figure 7:
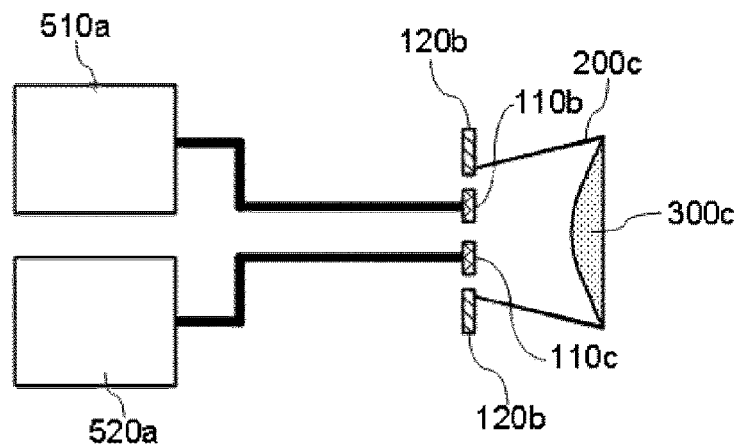
FIG. 7 is a block diagram of a sensor having the flat-beam generation antenna.

FIG. 7 is a block diagram of a sensor having the flat-beam generation antenna described in the fifth or sixth embodiment. In FIG. 7, the flat-beam generation antenna including the second and third radiation sources 110b and 110c, the third conductor 120b, the third horn 200c, and the third dielectric lens 300c schematically indicates the antenna configuration described in the fifth or sixth embodiment.

In FIG. 7, the second radiation source 110b is connected to the first transmitter circuit 510a, and the third radiation source 110c is connected to the first receiver circuit 520a.

The sensor of the embodiment indicated in FIG. 7 operates as follows. The signal output from the first transmitter circuit 510a is input to the second radiation source 110b and radiated from the third dielectric lens 300c as an electromagnetic wave. On the other hand, electromagnetic waves radiated from the third dielectric lens 300c is irradiated to such as an obstacle, and the electromagnetic waves reflected by such as the obstacle is converted in to an electric signal in the third radiation source 110c via the third dielectric lens 300c and input to the first receiver circuit 520a.

The sensor having the flat-beam generation antenna operating in this manner is used as a sensor for measuring a distance to such as an obstacle and a relative speed of such as the obstacle, and in comparison with the sensor described in the fourth embodiment, isolation between transmission and reception can be increased.

Eighth Embodiment

Figure 8:
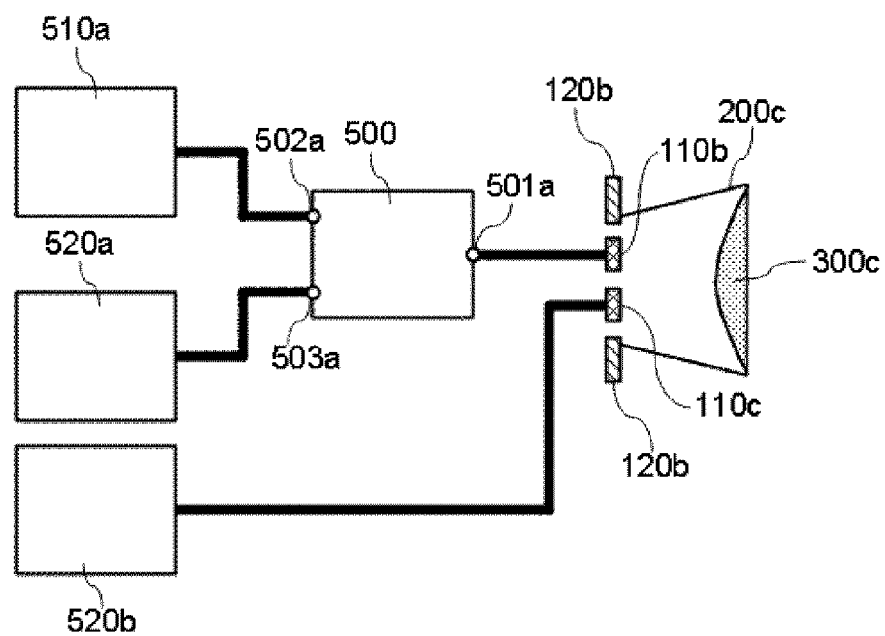
FIG. 8 is a block diagram of a sensor having the flat-beam generation antenna.

FIG. 8 is a block diagram of a sensor having the flat-beam generation antenna according to the fifth or sixth embodiment. In FIG. 8, the flat-beam generation antenna including the second receiver circuit 520b, the second and third radiation sources 110b and 110c, the third conductor 120b, the third horn 200c, and the third dielectric lens 300c schematically indicates the antenna configuration described in the fifth or sixth embodiment.

In FIG. 8, the second radiation source 110b is connected to the first terminal 501a, the first transmitter circuit 510a is connected to the second terminal 502a, the first receiver circuit 520a is connected to the third terminal 503a, and the third radiation source 110c is connected to the second receiver circuit 520b. As in the fourth embodiment, the divider circuit 500 operates to output a signal input from the second terminal 502a to the first terminal 501a and to output a signal input from the first terminal 501a to the third terminal 503a.

The sensor of the embodiment indicated in FIG. 8 operates as follows. The signal output from the first transmitter circuit 510a is input to the second radiation source 110b via the divider circuit 500 and radiated from the third dielectric lens 300c as an electromagnetic wave. On the other hand, electromagnetic waves radiated from the third dielectric lens 300c are irradiated to such as an obstacle, and the electromagnetic waves reflected by such as the obstacle are converted into an electric signal in the second radiation source 110b via the third dielectric lens 300c and input to the first receiver circuit 520a via the divider circuit 500. Further, the reflected electromagnetic waves are converted in an electric signal in the third radiation source 110c via the third dielectric lens 300c and input to the second receiver circuit 520b. In other words, the sensor according to the embodiment includes one transmitter channel and two receiver channels.

A sensor having a flat-beam generation antenna which operates in this manner can be used in a radar for measuring the azimuth of the fourth virtual line B2-B2' of such as an obstacle in addition to a distance to such as the obstacle and a relative speed thereof.

Ninth Embodiment

Figure 9:
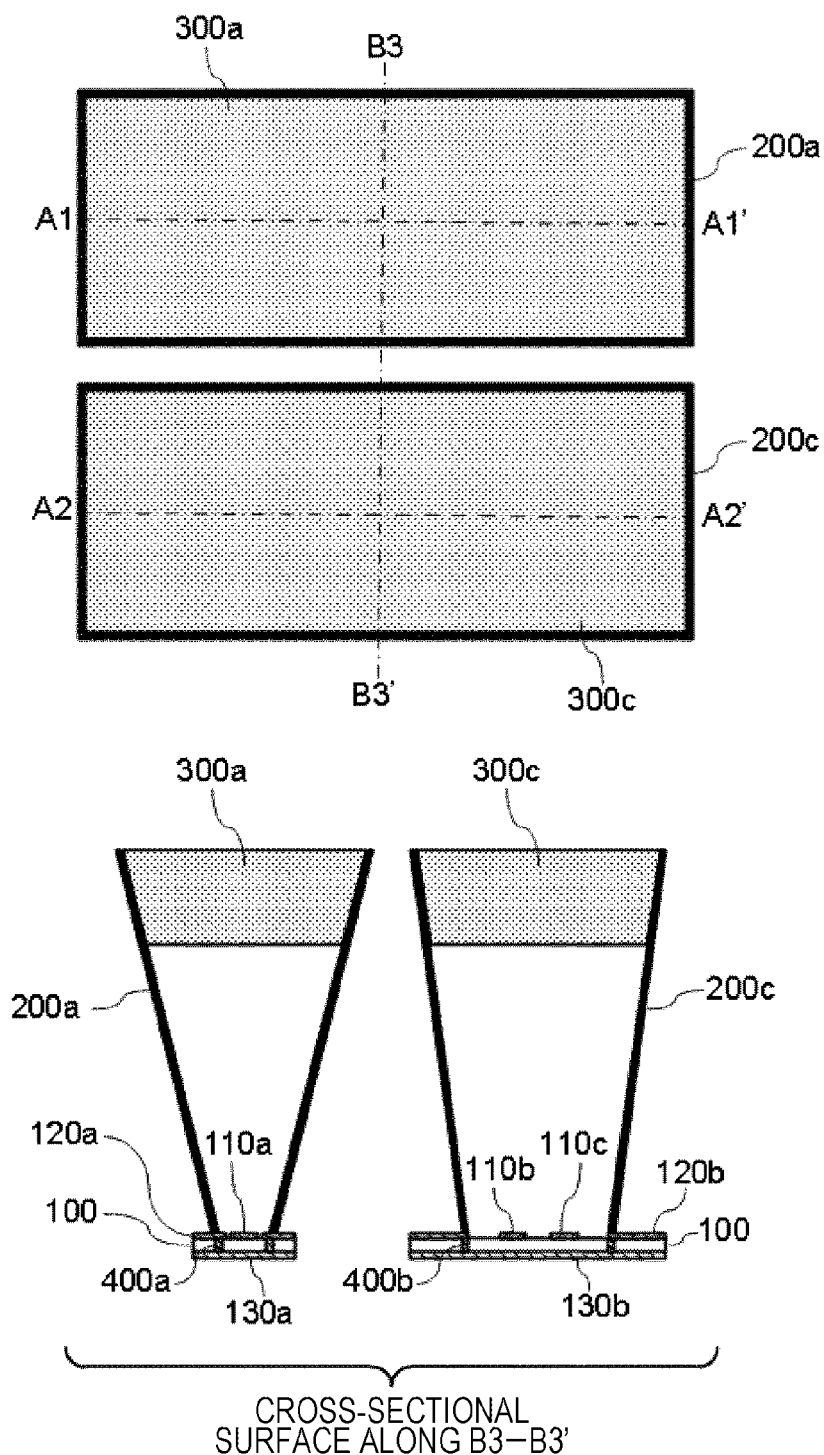
FIG. 9 illustrates a structural view of the flat-beam generation antenna.
Figure 10:
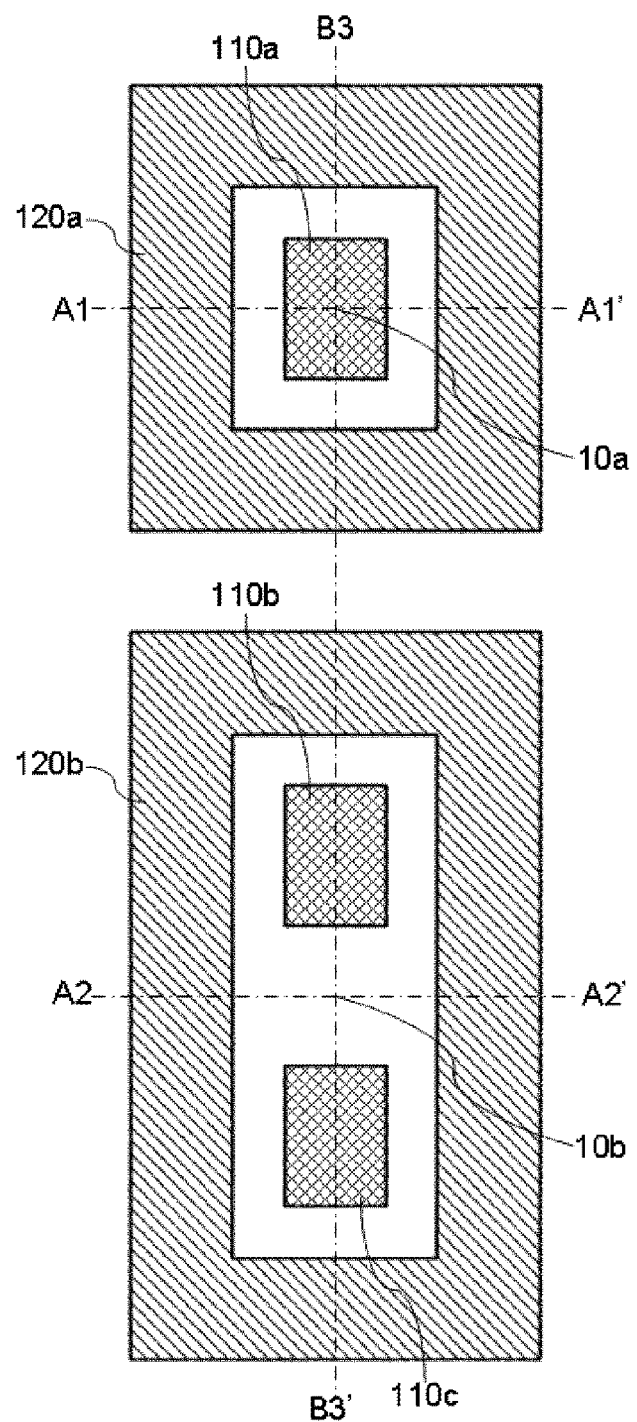
FIG. 10 illustrates a structural view of the flat-beam generation antenna.

FIGS. 9 and 10 are structural diagrams of a flat-beam generation antenna according to a ninth embodiment. In FIGS. 9 and 10, the fifth virtual line B3-B3' is an virtual line in the radiation-side opening surface of the first or third horn 200a or 200c. The fifth virtual line B3-B3' passes through the midpoint of the first virtual line A1-A1' and the midpoint of the third virtual line A2-A2' and is orthogonal to the first virtual line A1-A1' and the third virtual line A2-A2'.

That is, the flat-beam generation antenna of the present embodiment has a structure in which the flat-beam generation antenna described in the first to third embodiments and the flat-beam generation antenna described in fifth or sixth embodiment are arranged such that the second virtual line B1-B1' and the third virtual line B2-B2' overlap with the fifth virtual line B3-B3'.

By such an antenna structure, the optical axis C1-C1' of the first dielectric lens 300a (not illustrated in FIG. 9) and the optical axis C2-C2' of the third dielectric lens 300c (not illustrated in FIG. 9) are parallel to each other, and therefore the beam center directions radiated from each antenna coincide. Further, the first virtual line A1-A1' and the third virtual line A2-A2' are parallel to each other, and therefore flat directions of the beams radiated from each antenna are equal.

Therefore, the flat-beam generation antenna according to the present embodiment can improve antenna gain in comparison with the flat-beam generation antenna described in the first to third embodiments or the fifth or sixth embodiment.

Each of the connection structures of a feed line to the first radiation source 110a and feed lines to the second and third radiation sources 110b and 110c may be any of the structures described in the second and sixth embodiments.

In the present embodiment, two flat-beam generation antennas are disposed such that both of the second virtual line B1-B1' and the third virtual line B2-B2' overlap the fifth virtual line B3-B3'. However, this structure is not limited thereto, and the same effect can be obtained even if the second virtual line B1-B1' and the third virtual line B2-B2' are arbitrarily disposed so as to be parallel to each other.

Further, in the flat-beam generation antennas to be arranged, the type and the number of the flat-beam generation antennas described in the first to third embodiments or the fifth or sixth embodiment can be set to arbitrary combination and the number depending on the application.

Tenth Embodiment

Figure 11:
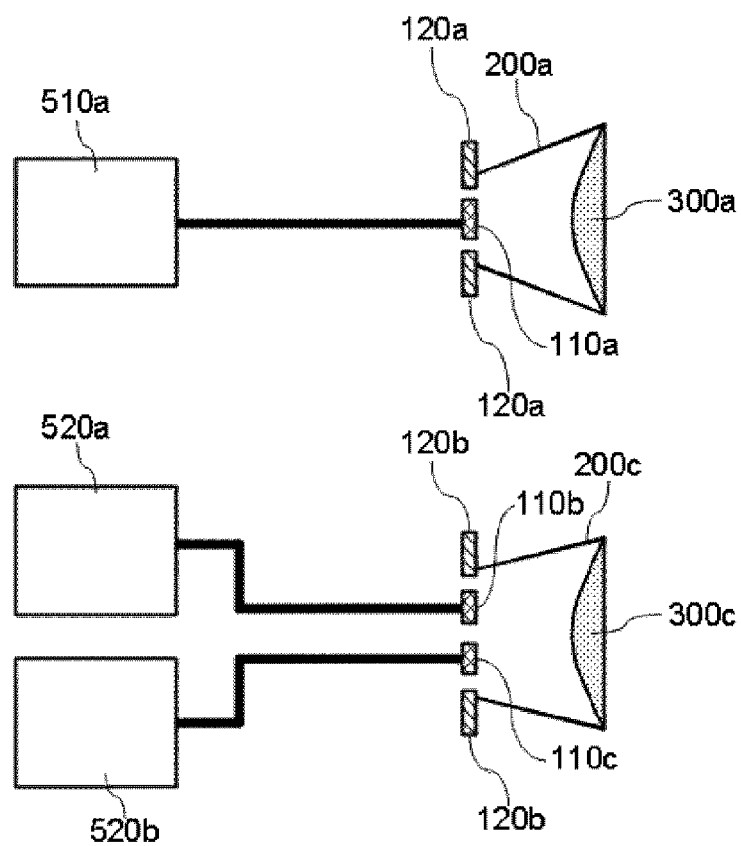
FIG. 11 is block diagrams of a sensor having the flat-beam generation antenna.

FIG. 11 is a block diagram of a sensor having a flat-beam generation antenna according to the ninth embodiment. In FIG. 11, the flat-beam generation antenna including the first radiation source 110a, the first conductor 120a, the first horn 200a, and the first dielectric lens 300a schematically indicates the antenna configuration described in the first to third embodiments, and in the flat-beam generation antenna including the second and third radiation sources 110b and 110c, the third conductor 120b, the third horn 200c, and the third dielectric lens 300c schematically indicates the antenna configuration described in the fifth or sixth embodiment.

In FIG. 11, the first radiation source 110a is connected to the first transmitter circuit 510a, the second radiation source 110b is connected to the first receiver circuit 520a, and the third radiation source 110c is connected to the second receiver circuit 520b.

The sensor of the embodiment indicated in FIG. 11 operates as follows. A signal output from the first transmitter circuit 510a is input to the first radiation source 110a and radiated from the first dielectric lens 300a as an electromagnetic wave. On the other hand, electromagnetic waves radiated from the first dielectric lens 300a are irradiated to such as an obstacle, and the electromagnetic waves reflected by such as the obstacle are converted into an electric signal in the second radiation source 110b via the third dielectric lens 300c and input to the first receiver circuit 520a. Further, the reflected electromagnetic wave is converted into an electric signal in the third radiation source 110c via the third dielectric lens 300c and input to the second receiver circuit 520b. In other words, the sensor according to the present embodiment includes one transmitter channel and two receiver channels.

A sensor having a flat-beam generation antenna operating in this manner can be used in a radar for measuring the azimuth of the fifth virtual line B3-B3' of such as an obstacle, in addition to a distance to such as the obstacle and the relative speed thereof. Further, it is possible to increase isolation between transmission and reception in comparison with the sensor having the flat-beam generation antenna described in the eighth embodiment.

Eleventh Embodiment

Figure 12:
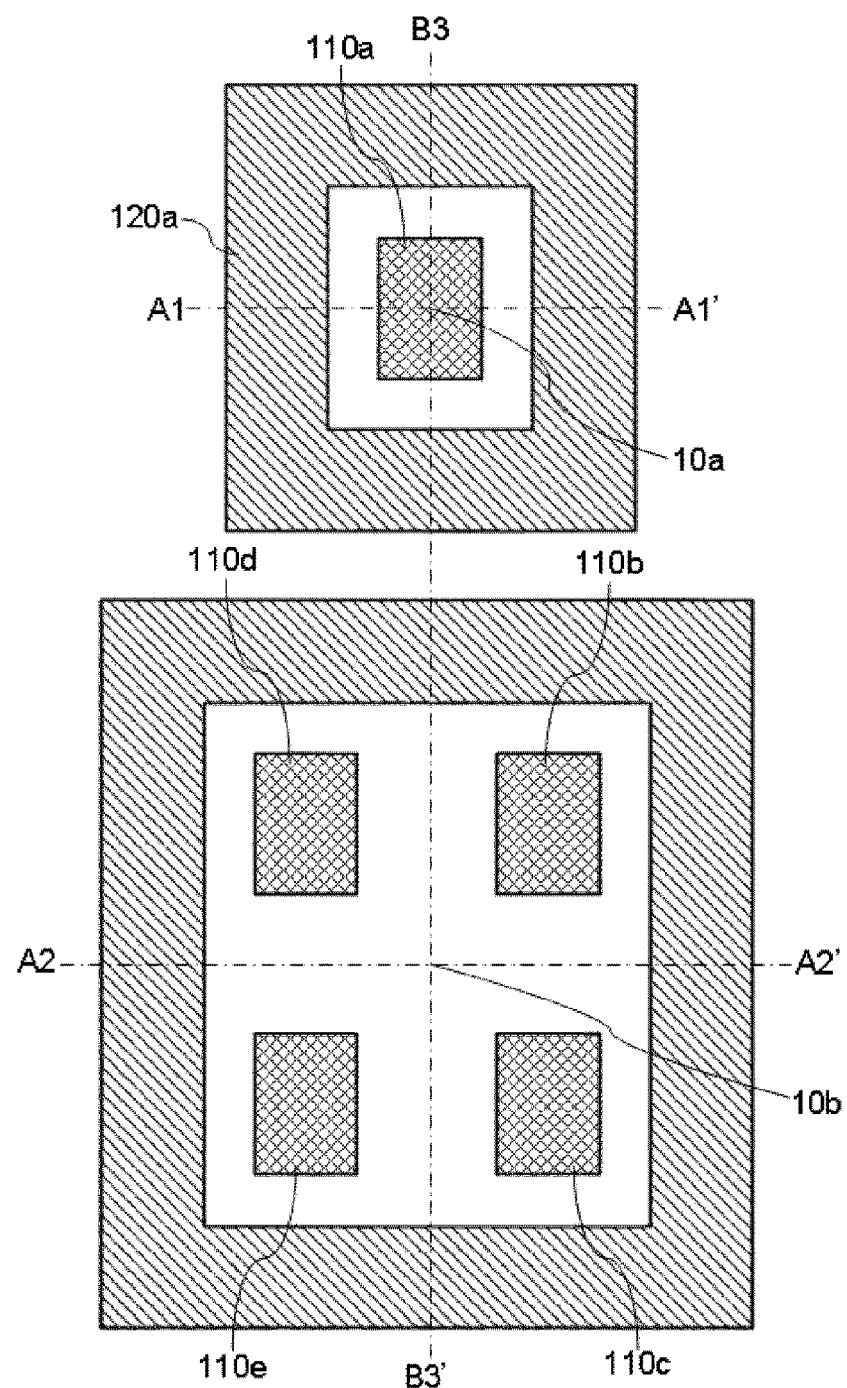
FIG. 12 indicates a structural view of the flat-beam generation antenna.
Figure 13:
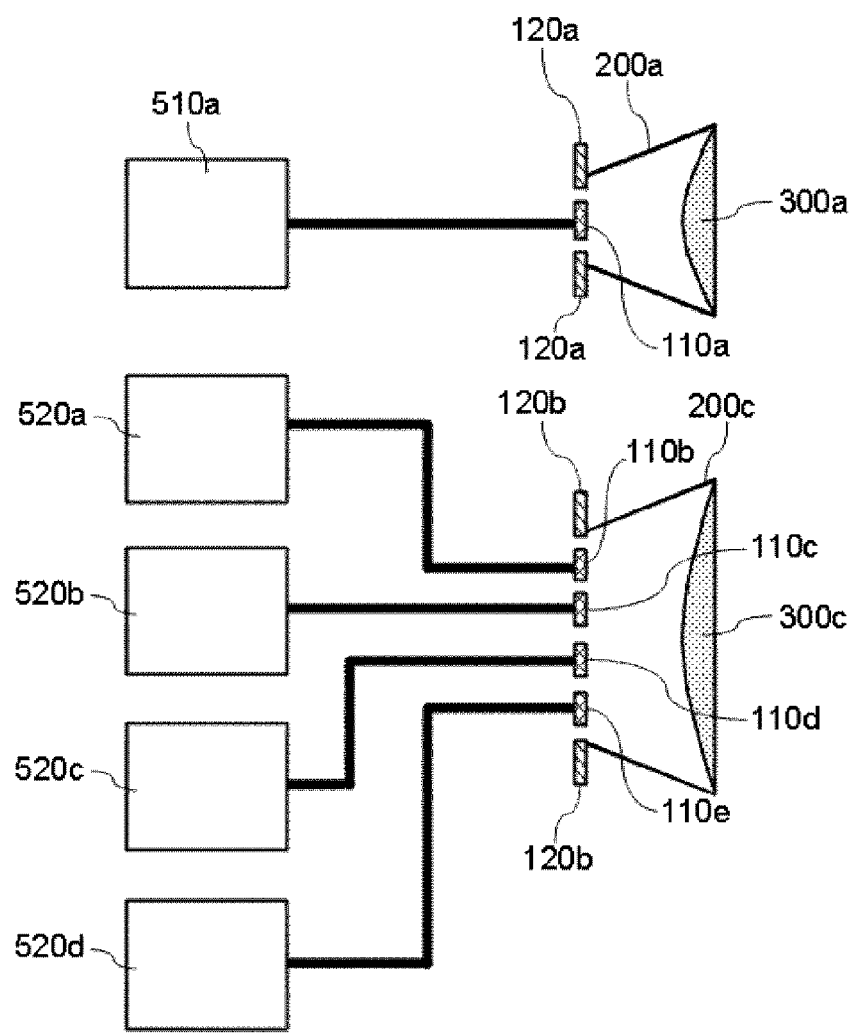
FIG. 13 is block diagrams of a sensor having the flat-beam generation antenna.

FIG. 12 is a structural view of a flat-beam generation antenna according to an eleventh embodiment. FIG. 13 is a block diagram of a sensor having the flat-beam generation antenna illustrated in FIG. 12.

FIG. 12 indicates a shape of the dielectric substrate 100 when viewed from the first surface side. In FIG. 12, fourth and fifth radiation sources 110d and 110e are included. In FIG. 12, the centers of the second to fifth radiation sources 110b to 110e are arranged at an asymmetrical point position with respect to the intersection 10b between the optical axis C2-C2' of the third dielectric lens 300c and the first surface of the dielectric substrate 100. In addition, the structures of the horn and the dielectric lens are the same as those in the first to third embodiments, the fifth to sixth embodiments, and the ninth embodiment.

In FIG. 13, third and fourth receiver circuits 520c and 520d are included. In FIG. 13, the flat-beam generation antenna including the first radiation source 110a, the first conductor 120a, the first horn 200a, and the first dielectric lens 300a schematically indicates the antenna configuration described in the first to third embodiments. Further, the flat-beam generation antenna formed by the second to fifth radiation sources 110b to 110e, the third conductor 120b, the third horn 200c, and the third dielectric lens 300c schematically indicates the antenna configuration described in FIG. 12.

In FIG. 13, the first radiation source 110a is connected to the first transmitter circuit 510a, the second radiation source 110b is connected to the first receiver circuit 520a, the third radiation source 110c is connected to the second receiver circuit 520b, the fourth radiation source 110d is connected to the third receiver circuit 520c, and the fifth radiation source 110e is connected to the fourth receiver circuit 520d.

The sensor of the embodiment indicated in FIG. 13 operates as follows. A signal output from the first transmitter circuit 510a is input to the first radiation source 110a and radiated from the first dielectric lens 300a as an electromagnetic wave. On the other hand, electromagnetic waves radiated from the first dielectric lens 300a are irradiated to such as an obstacle. The electromagnetic waves reflected by such as the obstacle are converted into an electric signal in the second radiation source 110b via the third dielectric lens 300c and input to the first receiver circuit 520a. The reflected electromagnetic waves are converted into an electrical signal at the third radiation source 110c via the third dielectric lens 300c and input to the second receiver circuit 520b. The reflected electromagnetic waves are converted into an electric signal in the fourth radiation source 110d via the third dielectric lens 300c and input to the third receiver circuit 520c. The reflected electromagnetic waves are converted into an electric signal in the fifth radiation source 110e via the third dielectric lens 300c and input to the fourth receiver circuit 520d. In other words, the sensor according to the present embodiment includes one transmitter channel and four receiver channels.

The sensor having the flat-beam generation antenna according to the present embodiment, which operates in this manner, can be used in a radar for measuring the azimuth of the first virtual line A1-A1' or the third virtual line A2-A2' of an obstacle in addition to a distance to such as the obstacle, a relative speed thereof, and the azimuth of the fifth virtual line B3-B3' thereof.

Twelfth Embodiment

Figure 14:
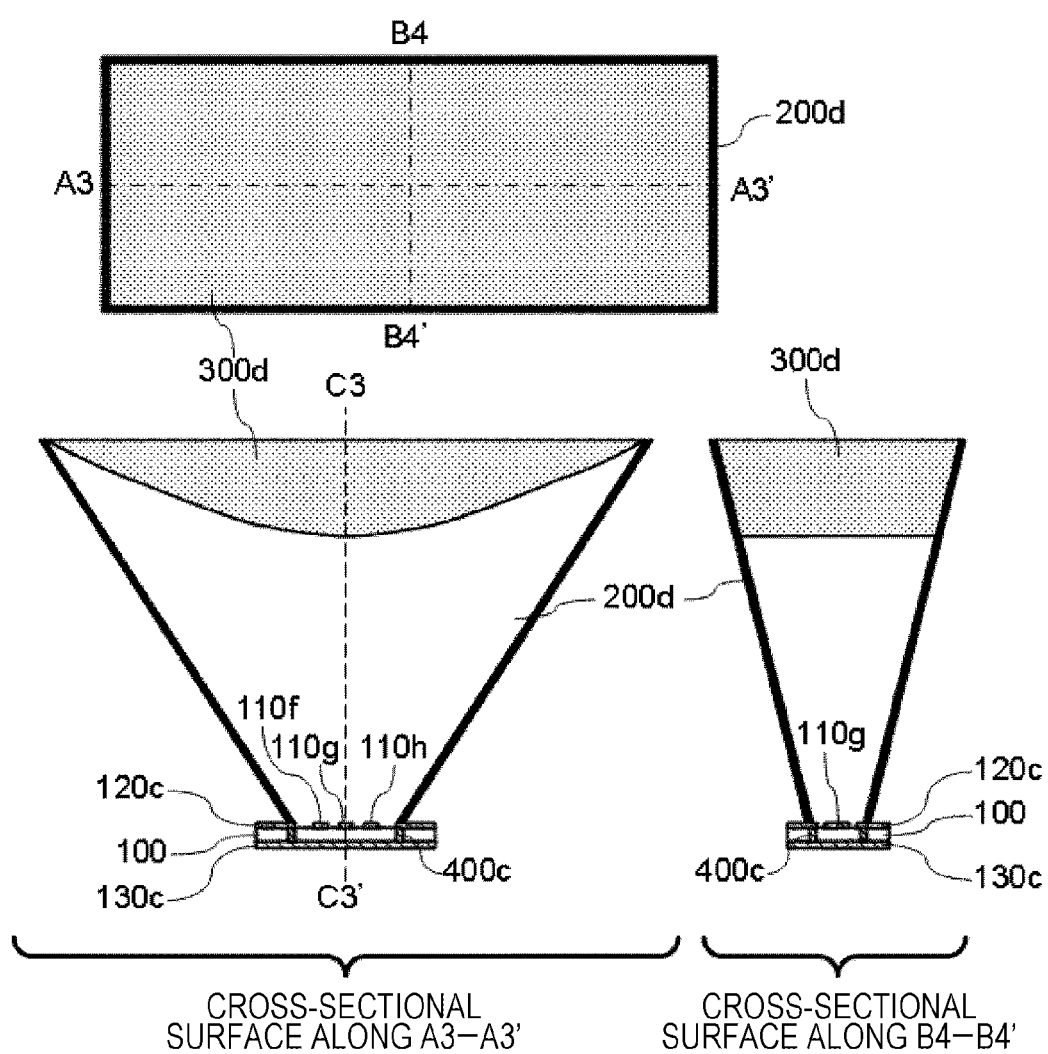
FIG. 14 indicates a structural view of the flat-beam generation antenna.
Figure 15:
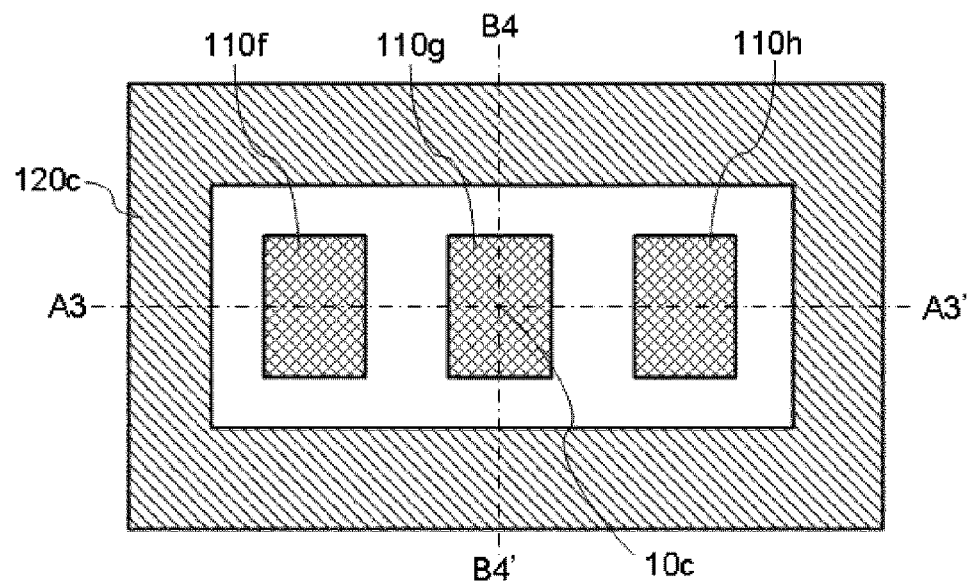
FIG. 15 indicates a structural view of the flat-beam generation antenna.
Figure 16:
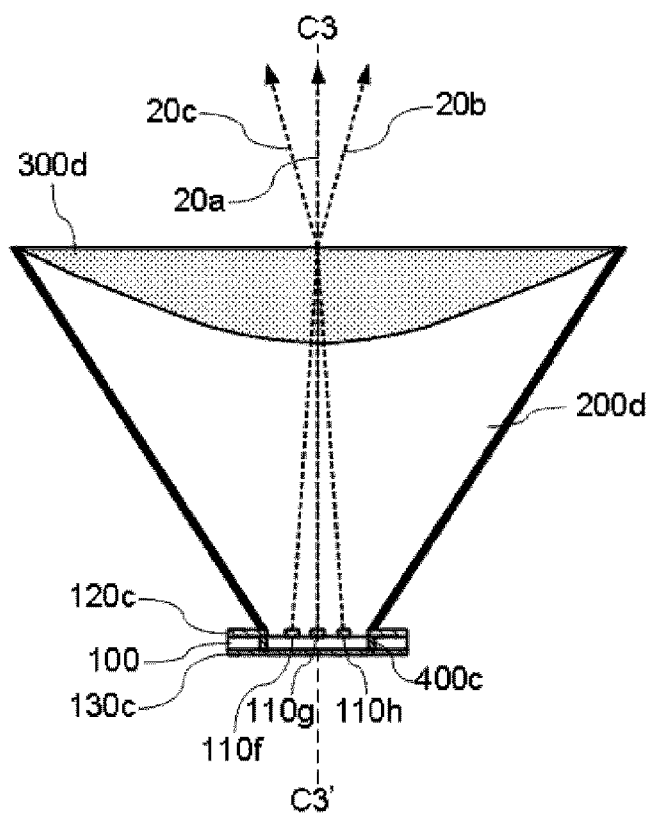
FIG. 16 indicates an operation explanatory view of the flat-beam generation antenna.

FIGS. 14 and 15 are structural diagrams of a flat-beam generation antenna according to a twelfth embodiment. FIG. 16 is a conceptual diagram indicating an operation of the flat-beam generation antenna described in FIGS. 14 and 15.

In FIGS. 14 and 15, the flat-beam generation antenna includes the dielectric substrate 100, fifth to seventh radiation sources 110f to 110h, a via hole 400c, a fourth horn 200d, and a fourth dielectric lens 300d. The fifth to seventh radiation sources 110f to 110h are formed on a first surface of the dielectric substrate 100. The via hole 400c is formed on a fifth conductor 120c formed on a first surface of the dielectric substrate 100, a sixth conductor 120c formed on a second surface opposed to the first surface of the dielectric substrate 100, and the dielectric substrate 100. The fourth horn 200d is disposed on the first surface side of the dielectric substrate 100, and at least an inner surface thereof is formed of a conductor. The fourth dielectric lens 300d is provided inside the fourth horn 200d.

A sixth virtual line A3-A3' is a virtual line in a radiation-side opening surface of the fourth horn 200d. A seventh virtual line B4-B4' is a virtual line in the radiation-side opening surface of the fourth horn 200d. An optical axis C3-C3' is an optical axis of the fourth dielectric lens 300d. An intersection 10c is an optical axis of the optical axis C3-C3' of the fourth dielectric lens 300d and the first surface of the dielectric substrate 100.

The sixth virtual line A3-A3' is a line passing through the center of a radiation-side opening of the fourth horn 200d in the drawing and having the shortest length. The seventh virtual line B4-B4' is a line passing through the center of the sixth virtual line A3-A3' and orthogonal to the sixth virtual line A3-A3'. In the present embodiment, the length of the sixth virtual line A3-A3' is longer than the length of the seventh virtual line B4-B4'. That is, in the embodiment, the radiation-side opening drawing of the fourth horn 200d has a rectangular shape in which the length in a direction of the sixth virtual line A3-A3' is longer than the length of the seventh virtual line B4-B4'.

The drawing on the upper side of FIG. 14 indicates a shape of the flat-beam generation antenna according to the present embodiment when viewed from the radiation-side opening side of the fourth horn 200d. Further, the drawing on the lower left side of FIG. 14 indicates a sectional shape along the sixth virtual line A3-A3' of the flat-beam generation antenna according to the embodiment. Further, the drawing on the lower right side of FIG. 14 indicates a sectional shape along the seventh virtual line B4-B4' of the flat-beam generation antenna according to the embodiment.

FIG. 15 indicates a shape of the dielectric substrate 100 when viewed from the first surface side. On the first surface of the dielectric substrate 100, the fifth conductor 120c is formed so as to surround the fifth to seventh radiation sources 110f to 110h at a predetermined distance from the fifth to seventh radiation sources 110f to 110h and electrically connected to the sixth conductor 130c formed on the second surface of the dielectric substrate 100 via the via hole 400c. As a result, the fifth conductor 120c and the sixth conductor 130c operate as a reference potential surface of the fifth to seventh radiation sources 110f to 110h, and therefore each of the fifth to seventh radiation sources 110f to 110h operates as a patch antenna and emits electromagnetic waves in a direction of the first surface of the dielectric substrate 100.

Further, the radiation source-side opening opposed to the radiation-side opening of the fourth horn 200d is disposed on the first surface side of the dielectric substrate 100 so as to encompass the fifth to seventh radiation sources 110f to 110h. The structure of the fifth to seventh radiation sources 110f to 110h and the fourth horn 200d enable that the electromagnetic waves radiated from the fifth to seventh radiation sources 110f to 110h are converted from a spherical wave to a plane wave by the fourth horn 200d, and a beam having directionality in a desired direction is radiated.

Further, in the embodiment, the length of the sixth virtual line A3-A3' is longer than the seventh virtual line B4-B4', and therefore a flat beam is generated such that, in the shape of the beam emitted from the fourth horn 200d, the width in a direction of the seventh virtual line B4-B4' is wider than the width in a direction of the sixth virtual line A3-A3'.

An interval at which the via holes 400c are arranged is desirably shorter than the length of a quarter of wavelength in the dielectric substrate 100 of the electromagnetic wave to be used.

Further, by electrically connecting the fourth horn 200d to the fifth conductor 120c, the potential of the fourth horn 200d can be made equal to the reference potential of the fifth to seventh radiation sources 110f to 110h. Therefore, the electromagnetic waves radiated from the fifth to seventh radiation sources 110f to 110h can be efficiently transmitted to the fourth horn 200d.

Furthermore, by disposing the fourth dielectric lens 300d having a convex shape in a direction of the radiation source-side opening at the radiation-side opening of the fourth horn 200d, the length from the radiation source-side opening of the fourth horn 200d to the radiation-side opening can be shortened, and it is possible to miniaturize an antenna.

Further, the cross-sectional shape of the fourth dielectric lens 300d has a cylindrical shape in which the direction of the sixth virtual line A3-A3' is a hyperbolic shape, and the direction of the seventh virtual line B4-B4' is a linear shape. Accordingly, it is possible to suppress each side-lobe of the beams radiated from the fourth dielectric lens 300d in the azimuth of the sixth virtual line A3-A3' and the azimuth the seventh virtual line B4-B4'.

Further, in the direction of the sixth virtual line A3-A3', the center of the sixth radiation source 110g is positioned at the intersection 10c between the optical axis C3-C3' of the fourth dielectric lens 300d and the first surface of the dielectric substrate 100, and the centers of the fifth radiation source 110f and the seventh radiation source 110h are located at symmetrical positions with respect to the intersection 10c.

The operation of the flat-beam generation antenna according to the present embodiment indicated in FIGS. 14 and 15 will be described with reference to FIG. 16. In FIG. 16, the first to third radiation directions 20a to 20c are indicated.

When electric power is supplied to each of the fifth to seventh radiation sources 110f to 110h or when electric power is supplied only to the sixth radiation source 110g, the center of the beam radiated from the fourth dielectric lens 300d is disposed in the radiation direction 20a parallel to the optical axis C3-C3' of the fourth dielectric lens 300d. On the other hand, when equal electric power is supplied to the fifth radiation source 110f and the sixth radiation source 110g and is not supplied to the seventh radiation source 110h, the center of the beam radiated from the fourth dielectric lens 300d is positioned in the radiation direction 20b shifted in the A3' direction of the sixth virtual line A3-A3'. Further, when equal electric power is supplied to the sixth radiation source 110g and the seventh radiation source 110h and not supplied to the fifth radiation source 110f, the center of the beam radiated from the fourth dielectric lens 300d is disposed in the radiation direction 20c shifted to the A3 direction in the sixth virtual line A3-A3'.

Therefore, in the flat-beam generation antenna according to the embodiment, it is possible to perform beam forming in the direction of the sixth virtual line A3-A3' having a narrow radiation beam width.

It should be noted that the shape of the radiation side opening of the fourth horn 200d may have any shape described in the third embodiment. Further, the side surface shape of the fourth horn 200d may be any of the shapes described in the third embodiment.

Thirteenth Embodiment

Figure 17:
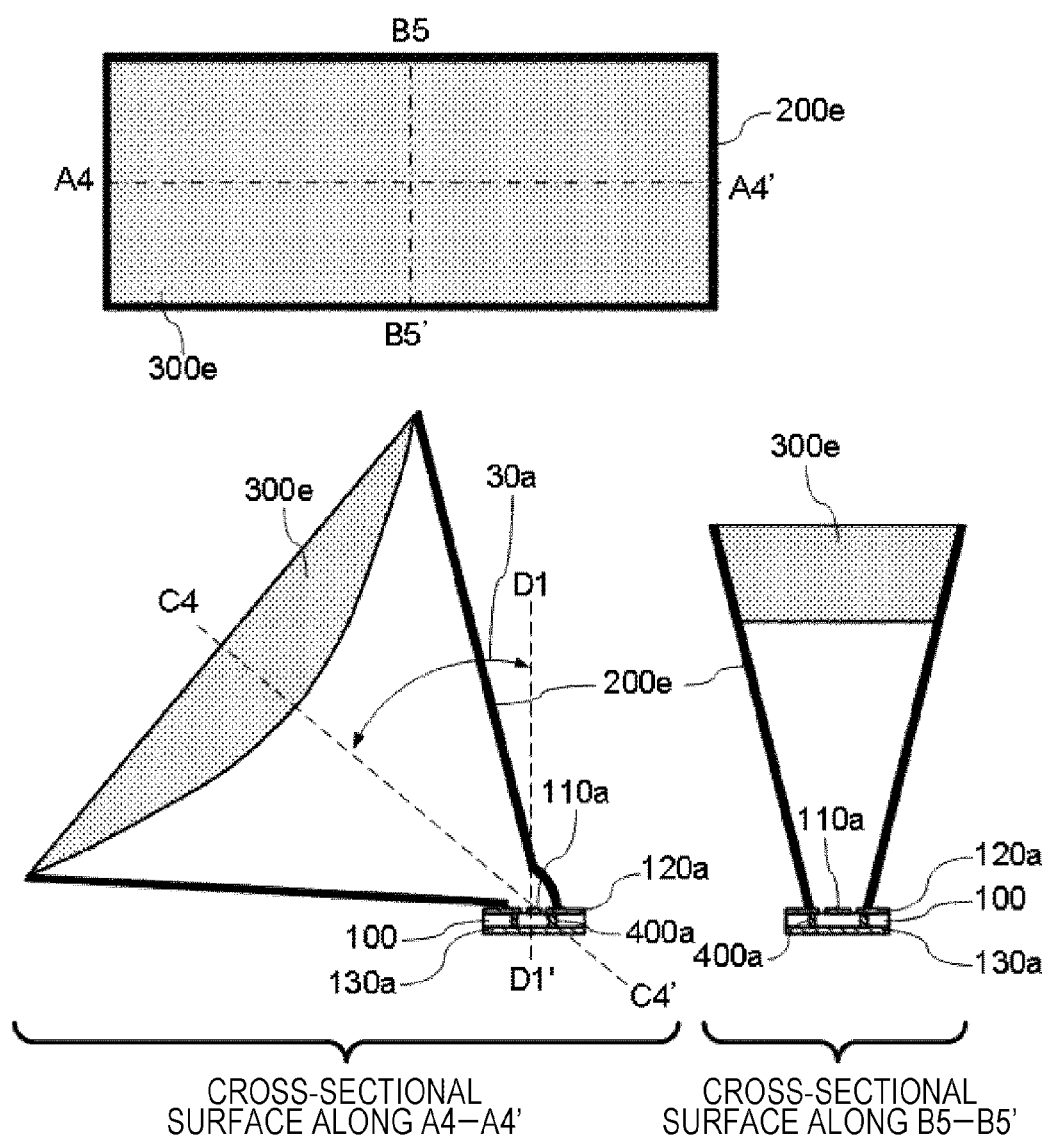
FIG. 17 indicates a structural view of the flat-beam generation antenna.

FIG. 17 is a structural diagram of a flat-beam generation antenna according to the embodiment. In FIG. 17, the flat-beam generation antenna includes a fifth horn 200e and a fifth dielectric lens 300e. At least the inner surface of the fifth horn 200e is formed of a conductor. In FIG. 17, the eighth virtual line A4-A4' is a virtual line in the radiation-side opening surface of the fifth horn 200e, and the ninth virtual line B5-B5' is a virtual line in the radiation side opening surface of the fifth horn 200e. The line C4-C4' is a target axis on a cross section in the direction of the eighth virtual line A4-A4' of the fifth horn. The virtual normal line D1-D1' is a virtual normal line indicating a direction vertical to the first surface of the dielectric substrate 100. The tilt angle 30a is a tilt angle formed between the target axis C4-C4' and the virtual normal line D1-D1'.

The eighth virtual line A4-A4' is a line passing through the center of a radiation side opening of the fifth horn 200e in the drawing and having the shortest length. The ninth virtual line B5-B5' is a line passing through the center of the eighth virtual line A4-A4' and orthogonal to the eighth virtual line A4-A4'. In the present embodiment, the length of the eighth virtual line A4-A4' is longer than the length of the ninth virtual line B5-B5'. That is, in the embodiment, the radiation-side opening drawing of the fifth horn 200e is a rectangular shape in which the length in a direction of the eighth virtual line A4-A4' is longer than the length of the ninth virtual line B5-B5'.

The drawing on the upper side of FIG. 17 indicates a shape of the flat-beam generation antenna according to the embodiment when viewed from the radiation-side opening side of the fifth horn 200e. Further, the drawing on the lower left side of FIG. 17 indicates a sectional shape along the eight virtual line A4-A4' of the flat-beam generation antenna of the embodiment. Further, the drawing on the lower right side of FIG. 17 indicates a sectional shape along the ninth virtual line B5-B5' of the flat-beam generation antenna according to the embodiment.

In FIG. 17, the radiation source side opening positioned on the side opposite to the radiation-side opening of the fifth horn 200e is formed so as to encompass the first radiation source 110a, and such that the tilt angle 30a becomes an arbitrary angle of 0° or more, the target axis C4-C4' in the direction of the eighth virtual line A4-A4' of the fifth horn 200e and the virtual normal line D1-D1' are formed on the first surface side of the dielectric substrate 100. The structure of the first radiation source 110a and the fifth horn 200e enables that the electromagnetic wave surface of an electromagnetic wave radiated from the first radiation source 110a is converted from a spherical wave to a plane wave by the fifth horn 200e, and a beam having a directivity in a desired direction tilted by the tilt angle 30a from the direction of the virtual normal line D1-D1' of the dielectric substrate 100 can be emitted. Further, in the embodiment, the length of the eighth virtual line A4-A4' is longer than the ninth virtual line B5-B5', and therefore a flat beam is generated such that, in the shape of the beam radiated from the fifth horn 200e, the width in the direction of the ninth virtual line B5-B5' is wider than the width in a direction of the eighth virtual line A4-A4'.

Further, by electrically connecting the fifth horn 200e to the first conductor 120a, a potential of the fifth horn 200e can be made equal to the reference potential of the first radiation source 110a. Therefore, the electromagnetic wave irradiated from the first radiation source 110a can be efficiently transmitted to the fifth horn 200e.

Further, when the fifth dielectric lens 300e of the radiation-side opening of the fifth horn 200e disposed so as to overlap an optical axis of the fifth dielectric lens and the target axis C4-C4' of the fifth horn, the length from the radiation source-side opening of the fifth horn 200e to the radiation-side opening can be shortened, and it is possible to miniaturize an antenna.

Further, the cross-sectional shape of the fifth dielectric lens 300e has a cylindrical shape in which the direction of the eighth virtual line A4-A4' is a hyperbolic shape, and the direction of the ninth virtual line B5-B5' is a linear shape. Accordingly, it is possible to suppress each side-lobe of the beams radiated from the fifth dielectric lens 300e in the azimuth of the eighth virtual line A4-A4' and the azimuth of the ninth virtual line B5-B5'.

In the direction of the eighth virtual line A4-A4', the center of the first radiation source 110a is desirably disposed at an intersection (unsigned) between a target axis C4-C4' and the first surface of the dielectric substrate 100.

It should be noted that the shape of the radiation side opening of the fifth horn 200e may have any shape described in the third embodiment. Further, the side surface shape of the fifth horn 200e may be any of the shapes described in the third embodiment.

The flat-beam generation antenna according to the present embodiment can change the virtual normal line D1-D1' of the dielectric substrate 100 in a desired direction tilted by the tilt angle 30a without changing an installation angle of the dielectric substrate 100 in the direction of the eighth virtual line A4-A4' having a narrow irradiation beam width.

Fourteenth Embodiment

Figure 18:
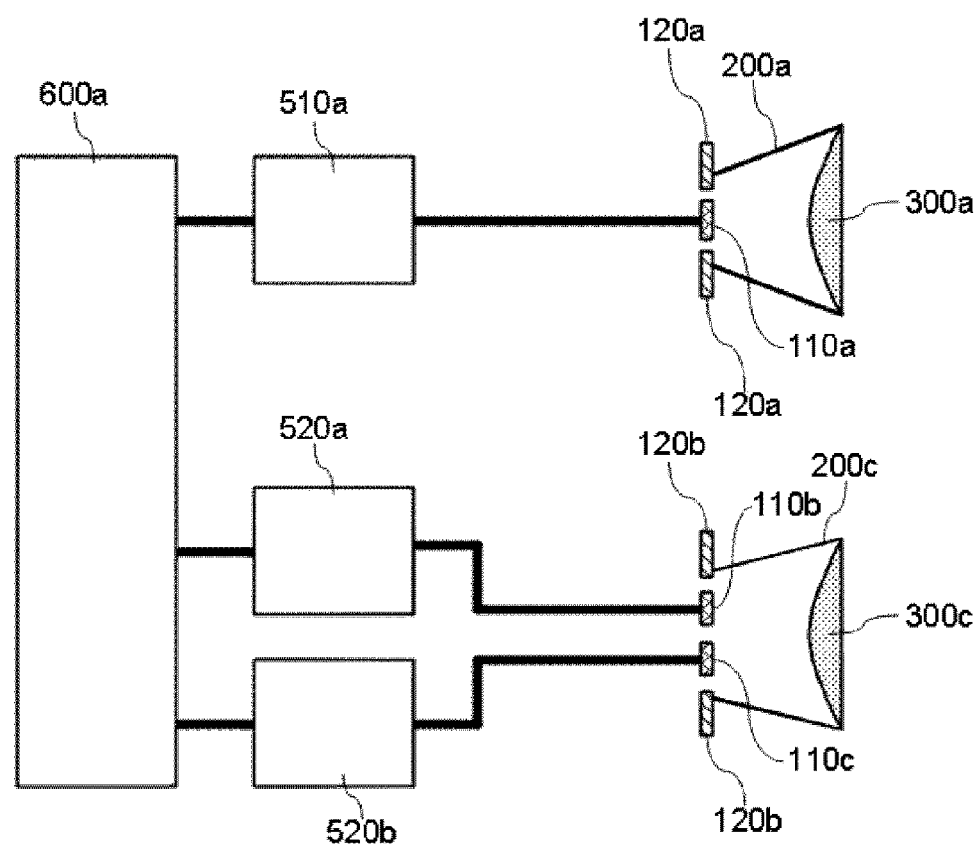
FIG. 18 is a block diagram of a driving support system including a sensor having the flat-beam generation antenna.

FIG. 18 is a block diagram of a driving support system including a sensor having the flat-beam generation antenna described in the tenth embodiment. In FIG. 18, the driving support system includes a vehicle control circuit 600a which controls operations of a moving body for such as power train control and vehicle body control.

In the driving support system including the sensor having the flat-beam generation antenna according to the present embodiment, the vehicle control circuit 600a is connected to the first transmitter circuit 510a, the first receiver circuit 520a, and the second receiver circuit 520b. This connection method may be a wired method using a cable or a wireless method such as a wireless LAN (Local Area Network).

The driving support system according to the embodiment indicated in FIG. 18 operates as follows. A first transmission signal output from the vehicle control circuit 600a and input to the first transmitter circuit 510a is output as a second transmission signal from the first transmitter circuit 510a and further input to the first radiation source 110a and emitted from the first dielectric lens 300a as a transmission electromagnetic wave. On the other hand, the transmission electromagnetic wave radiated from the first dielectric lens 300a is irradiated to such as an obstacle, and a reception electromagnetic wave reflected by such as the obstacle is converted into a first reception signal in the second radiation source 110b via the third dielectric lens 300c and input to the first receiver circuit 520a. Further, the reception electromagnetic wave is converted into a second reception signal in the third radiation source 110c via the third dielectric lens 300c and input to the second receiver circuit 520b. Further, the first reception signal is output as a third reception signal from the receiver circuit 520a and input to the vehicle control circuit 600a, and the second reception signal is output as a fourth reception signal from the receiver circuit 520b and input to the vehicle control circuit 600a.

In other words, the sensor according to the present embodiment has one transmission channel and two reception channels, and the driving support system has a sensor as a radar which can measure a distance to such as an obstacle, a relative speed of such as the obstacle, and an azimuth of the fifth virtual line B3-B3' of the obstacle.

Further, the vehicle control circuit 600a recognizes a position of and a distance to such as an obstacle based on a relationship between the first transmission signal and the third and fourth reception signals and outputs a control signal to a power train and a vehicle body controller. As a result, it becomes possible to control operations of the whole moving body according to the surrounding situation.

Fifteenth Embodiment

Figure 19A:
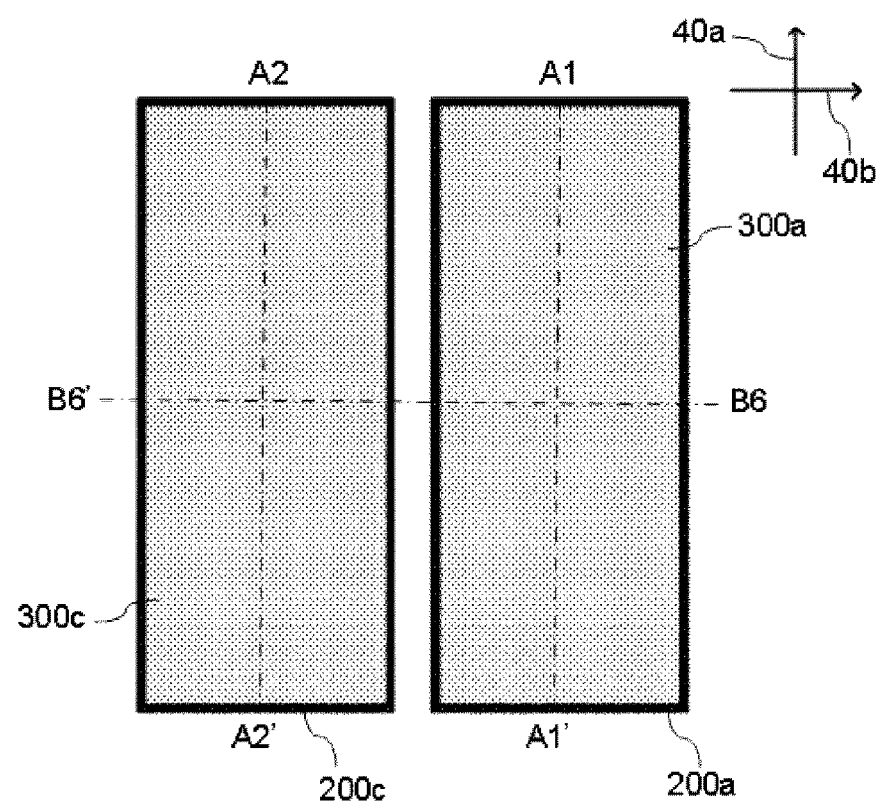
FIG. 19A is a view indicating attachment angles, to a moving object, of a sensor having the flat-beam generation antenna.

FIG. 19A is a view indicating an attachment angle of a sensor having the flat-beam generation antenna described in the tenth embodiment to a moving body. In FIG. 19A, 40a indicates a vertical direction, and 40b indicates a horizontal direction. The tenth virtual line B6-B6' is a tenth virtual line passing through the center of the first virtual line A1-A1' and the center of the fourth virtual line A2-A2'. In FIG. 19A, the first virtual line A1-A1' and the fourth virtual line A2-A2' are parallel to the vertical direction 40a.

In the sectional shape perpendicular to the beam radiation direction of a beam radiated from the flat-beam generation antenna according to the embodiment illustrated in FIG. 19A, the widths in the directions of the first virtual line A1-A1' and the fourth virtual line A2-A2' are narrower than the width in the direction of the tenth virtual line B6-B6'. Therefore, in the sectional shape perpendicular to the beam radiation direction of the beam radiated from the flat-beam generation antenna according to the embodiment, the direction in the vertical direction 40a can be narrower than the width in the horizontal direction 40b. With such an antenna structure, it is possible to realize a radar having a wide horizontal azimuth while reducing load clutter noise.

It should be noted that the attachment position of the sensor having the flat-beam generation antenna according to the present embodiment to a moving body may be any of the forward, sideward, and rearward of the moving body.

Sixteenth Embodiment

Figure 19B:
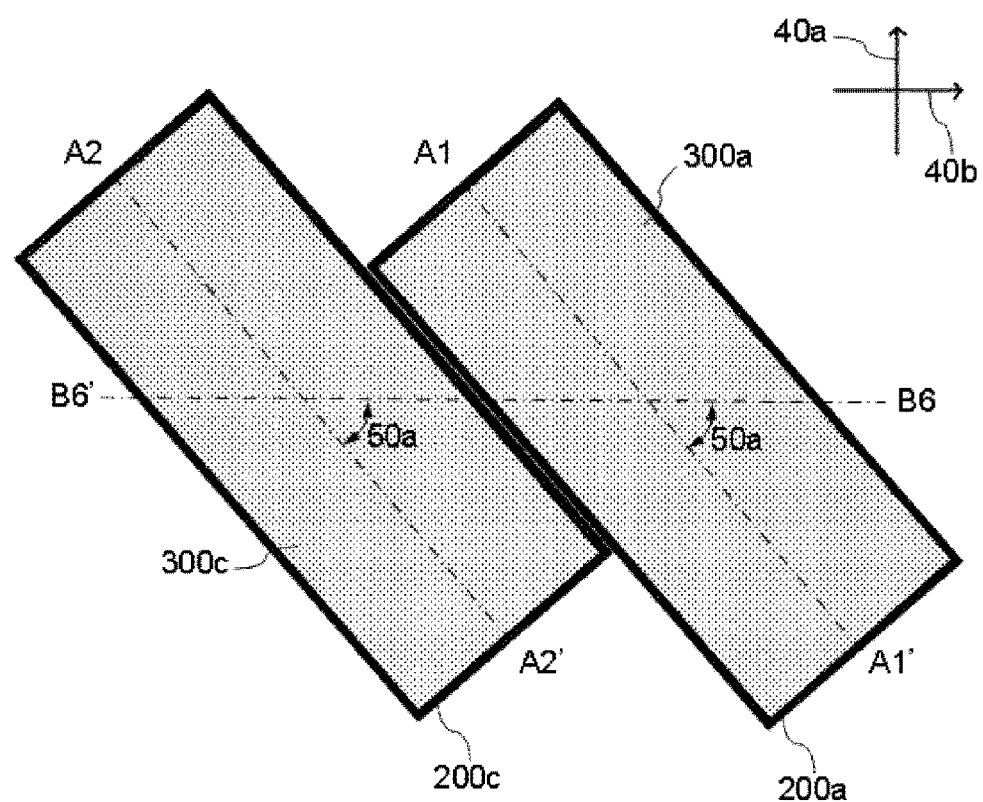
FIG. 19B is a view indicating attachment angles, to a moving object, of a sensor having the flat-beam generation antenna.

FIG. 19B is a view indicating an attachment angle of a sensor having the flat-beam generation antenna described in the tenth embodiment to a moving body. In FIG. 19, the polarization angle 50a is a polarization angle formed by the first virtual line A1-A1', the fourth virtual line A2-A2', and the tenth virtual line B6-B6'.

In FIG. 19B, the tenth virtual line B6-B6' is parallel to the horizontal direction 40b, and the polarization angle 50a is preferably 45°. A beam radiated from the flat-beam generation antenna according to the present embodiment indicated in FIG. 19B has a polarization angle of 45° with respect to the vertical direction 40a. Therefore, it is possible to reduce the influence of load clutter noise.

It should be noted that the attachment position of the sensor having the flat-beam generation antenna according to the present embodiment to a moving body may be any of the forward, sideward, and rearward of the moving body.

Seventeenth Embodiment

Figure 19C:
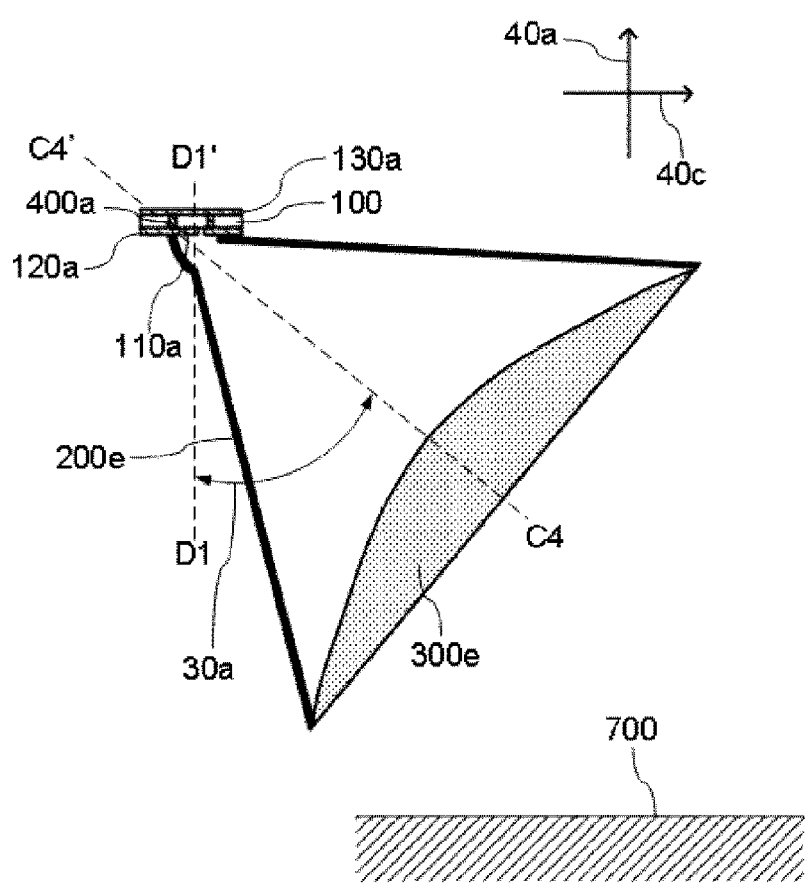
FIG. 19C is a view indicating attachment angles, to a moving object, of a sensor having the flat-beam generation antenna.

FIG. 19C is a view indicating an attachment angle of a sensor having the flat-beam generation antenna described in the thirteenth embodiment to a moving body. In FIG. 19C, a traveling direction 40c of the moving body and the ground 700 are indicated. In FIG. 19C, the cross-sectional direction of the eighth virtual line A4-A4' is parallel to the traveling direction 40c of the moving body.

The sensor having the flat-beam generation antenna according to the present embodiment indicated in FIG. 19C can be applied as a speed sensor for detecting a relative speed of a moving body.

In FIG. 19C, the flat-beam generation antenna is arranged such that the beam radiation direction faces the ground. However, the flat-beam generation antenna may be disposed at any position of a moving body according to the position of an object to be targeted for relative speed detection. Further, the object to be detected for the relative speed is not limited to the ground and may be an arbitrary fixed object such as a wall or a track.

The preferred forms of structures and operations of the flat-beam generation antenna according to the embodiment, the sensor having the flat-beam generation antenna, and the driving support system including the sensor according to the present embodiments are described in the first to seventeenth embodiments.

However, even if the number and the shape of the radiation sources included in the flat-beam generation antenna are different from those described in the first to seventeenth embodiments, the same effect can be obtained by the flat-beam generation antenna according to the present embodiment.

In the first to sixteenth embodiments, the first to fifth dielectric lenses 300a to 300e have a convex shape in the directions of the first to eight radiation sources 110a to 110h. However, the convex shape may be formed in a direction opposite to the first to eight radiation sources 110a to 110h. Further, in accordance with the shapes of the radiation-side opening surfaces of the first to fifth horns 200a to 200e, in the shapes of the first to fifth dielectric lenses 300a to 300e, the concave surface may be a rotating dipole shape in addition to a cylindrical shape.

Further, types and the number of combinations of the flat-beam generation antenna and the sensors having the flat-beam generation antenna may be arbitrary combinations other than those in the first to sixteenth embodiments.

Further, an attachment angle of the sensor having the flat-beam generation antenna to a moving body and the direction of a beam radiated from the flat-beam generation antenna may be arbitrary other than those in the fifteenth or seventeenth embodiment.

Further, materials included in the dielectric substrate 100 may be any of a resin-based material, a ceramic-based material, and a semiconductor material.

REFERENCE SIGNS LIST 10 intersection between optical axis of dielectric lens and first surface of dielectric substrate
20 radiation direction
100 dielectric substrate
110 radiation source
120 conductor
130 conductor
140 feed line
200 horn
300 dielectric lens
400 via hole
500 divider circuit
501 first terminal
502 second terminal
503 third terminal
510 transmitter circuit
520 receiver circuit
600 vehicle control circuit

The invention claimed is:

1. A sensor having an antenna, the antenna comprising:
a substrate;
a radiation source formed on a first surface of the substrate;
a first conductor formed on the first surface of the substrate; and
a wave guide configured to internally propagate electromagnetic waves radiated from the radiation source and radiate the electromagnetic waves as a beam,
wherein a radiation-side opening of the wave guide has a shape in which a first direction and a second direction are orthogonal to each other, and the second direction is longer than the first direction, a shape of an opening on the side opposite to the radiation-side opening is shorter in the second direction than in the first direction,
an edge of the opening on the side opposite to the radiation-side opening is disposed on a surface side of the substrate on which the radiation source formed so as to encompass the radiation source, a dielectric lens is disposed at the radiation-side opening and inside the wave guide,
the radiation side opening is one end of the antenna, and a flat side of the dielectric lens is flush with the one end of the antenna,
a radiation source-side opening is disposed on the first surface of the substrate, and
the first conductor surrounds the radiation source at a predetermined distance and the radiation source-side opening encompasses the first radiation source.

2. The sensor according to claim 1,
wherein the radiation-side opening is bigger than the opening opposite to the radiation-side opening, and the wave guide converts the electromagnetic waves radiated from the radiation source from a spherical wave to a plane wave.

3. The sensor according to claim 1,
wherein a reference potential portion is formed on a same surface as the radiation source formed on the substrate and around the radiation source and has a reference potential of the radiation source, and the reference potential portion and the wave guide are electrically connected.

4. The sensor according to claim 1,
wherein the dielectric lens is a cylindrical lens having a linear cross-sectional shape in the first direction and a hyperbolic cross-sectional shape in the second direction.

5. The sensor according to claim 1,
wherein the second directions of a plurality of antennas are arranged to be parallel to each other.

6. The sensor according to claim 5, further comprising:
a transmitter circuit; and
a receiver circuit,
wherein a number of transmitter circuits and a number of receiver circuits are equal to a number of radiation sources included in the antenna,
the transmitter circuits are connected to the radiation sources one by one, and
the receiver circuits are connected to remaining radiation sources one by one.

7. The sensor according to claim 1, further comprising:
a divider circuit including a first terminal, a second terminal, and a third terminal;
a transmitter circuit; and
a receiver circuit,
wherein the radiation source is connected to the first terminal of the divider circuit,
the transmitter circuit is connected to the second terminal of the divider circuit, and
the receiver circuit is connected to the third terminal of the divider circuit.

8. The sensor according to claim 1, further comprising:
a transmitter circuit, and
a receiver circuit,
wherein a number of transmitter circuits and a number of receiver circuits are equal to a number of radiation sources included in the antenna, and
the transmitter circuits are connected to the radiation sources one by one, and
the receiver circuits are connected to the radiation sources one by one.

9. A driving support system having a sensor including a plurality of antennas,
wherein the antenna comprises a radiation source formed on a first side of a substrate, a first conductor formed on the first surface of the substrate, and a wave guide configured to internally propagate electromagnetic waves radiated from the radiation source and radiate the electromagnetic waves as a beam,
a radiation-side opening of the wave guide has a shape in which a first direction and a second direction are orthogonal to each other, and the second direction is longer than the first direction, a shape of an opening on the side opposite to the radiation-side opening is shorter in the second direction than in the first direction,
an edge of the opening on the side opposite to the radiation-side opening is disposed on a surface side of the substrate on which the radiation source formed so as to encompass the radiation source,
a dielectric lens is disposed at the radiation-side opening and inside the wave guide,
the radiation side opening is one end of the antenna, and a flat side of the dielectric lens is flush with the one end of the antenna,
a radiation source-side opening is disposed on the first surface of the substrate, and
the first conductor surrounds the radiation source at a predetermined distance and the radiation source-side opening encompasses the first radiation source, and
the driving support system comprises:
transmitter circuits connected to radiation sources;
receiver circuits connected to the radiation sources of the plurality of antennas other than the radiation sources connected to the transmitter circuits; and
a driving controller connected to the transmitter circuit and the receiver circuit.

* * * * *